United States Patent
Solovyev et al.

(10) Patent No.: US 11,558,632 B2
(45) Date of Patent: Jan. 17, 2023

(54) ENCODER, A DECODER AND CORRESPONDING METHODS FOR INTER PREDICTION

(71) Applicant: HUAWEI TECHNOLOGIES CO., LTD., Guangdong (CN)

(72) Inventors: Timofey Mikhailovich Solovyev, Moscow (RU); Semih Esenlik, Munich (DE); Jianle Chen, San Diego, CA (US); Anand Meher Kotra, Munich (DE); Han Gao, Munich (DE); Biao Wang, Shenzhen (CN); Roman Igorevich Chernyak, Munich (DE); Alexander Alexandrovich Karabutov, Moscow (RU); Sergey Yurievich Ikonin, Moscow (RU)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/325,661

(22) Filed: May 20, 2021

(65) Prior Publication Data
US 2021/0281870 A1 Sep. 9, 2021

Related U.S. Application Data

(63) Continuation of application No. PCT/RU2019/050224, filed on Nov. 22, 2019.
(Continued)

(51) Int. Cl.
*H04N 19/503* (2014.01)
*H04N 19/105* (2014.01)
(Continued)

(52) U.S. Cl.
CPC ........ *H04N 19/503* (2014.11); *H04N 19/105* (2014.11); *H04N 19/13* (2014.11);
(Continued)

(58) Field of Classification Search
None
See application file for complete search history.

(56) References Cited

U.S. PATENT DOCUMENTS

| 8,948,259 B2 * | 2/2015 | Oh ...................... H04N 19/176 375/240.12 |
| 9,363,520 B2 * | 6/2016 | Park ..................... H04N 19/521 |

(Continued)

OTHER PUBLICATIONS

ITU-T H.265(Feb. 2018), Series H: Audiovisual and Multimedia Systems Infrastructure of audiovisual services-Coding of moving video, High efficiency video coding, total 692 pages.
(Continued)

*Primary Examiner* — Chikaodili E Anyikire
(74) *Attorney, Agent, or Firm* — Womble Bond Dickinson (US) LLP

(57) ABSTRACT

A prediction method for an image block comprising a first prediction sub-block and a second prediction sub-block, the prediction method comprising: parsing a first index from a bitstream, wherein the first index is used to obtain prediction information of the first prediction sub-block; parsing a second index from the bitstream; comparing the first index with the second index; adjusting the second index in the event that the second index is equal to or greater than the first index; and obtaining prediction information of the second prediction sub-block according to the adjusted second index.

28 Claims, 14 Drawing Sheets

Related U.S. Application Data

(60) Provisional application No. 62/905,367, filed on Sep. 24, 2019, provisional application No. 62/816,897, filed on Mar. 11, 2019, provisional application No. 62/787,678, filed on Jan. 2, 2019, provisional application No. 62/770,826, filed on Nov. 22, 2018.

(51) Int. Cl.
    *H04N 19/13*     (2014.01)
    *H04N 19/132*    (2014.01)
    *H04N 19/159*    (2014.01)
    *H04N 19/176*    (2014.01)

(52) U.S. Cl.
    CPC ......... *H04N 19/132* (2014.11); *H04N 19/159* (2014.11); *H04N 19/176* (2014.11)

(56) References Cited

U.S. PATENT DOCUMENTS

| | | |
|---|---|---|
| 2010/0080296 A1 | 4/2010 | Lee et al. |
| 2015/0085930 A1 | 3/2015 | Zhang et al. |
| 2016/0094851 A1 | 3/2016 | Pu et al. |
| 2017/0310990 A1 | 10/2017 | Hsu |
| 2020/0186799 A1* | 6/2020 | Wang ............... H04N 19/52 |
| 2020/0213622 A1* | 7/2020 | Xu ............... H04N 19/176 |
| 2021/0266539 A1* | 8/2021 | Lee ............... H04N 19/51 |
| 2022/0014775 A1* | 1/2022 | Lee ............... H04N 19/132 |

OTHER PUBLICATIONS

Ru-Ling Liao et al: "CE10.3.1.b: Triangular prediction unit mode", 12. JVET Meeting; Oct. 3, 2018-Oct. 12, 2018 Macao; (The Joint Video Exploration Team of 1S0/IEC JTC1/SC29/WG11 and ITU-T SG. 16), No. JVET-L0124-v2 8 pages.

Benjamin Brass et al, Versatile Video Coding (Draft 2), Joint Video Experts Team (JVET)of ITU-T SG 16 WP 3 and ISO/IEC JTC 1/SC 29/WG 11 , 11th Meeting: Ljubljana, SI, 10 Jul. 18, 2018, JVET-K1001-v7, 153 pages.URL:http://phenix.int evry.fr/jvet/doc_end_user/documents/12_Macao/wg11 /JVET-L0124-v6.zip JVET-L0124-text-v4.docx.

\* cited by examiner

ENCODER, A DECODER AND CORRESPONDING METHODS FOR INTER PREDICTION

CROSS-REFERENCE TO RELATED APPLICATIONS

This application is a continuation of International Application No. PCT/RU2019/050224, filed on Nov. 22, 2019, which claims priority to U.S. Provisional Patent Application Ser. No. 62/770,826, filed on Nov. 22, 2018 and U.S. Provisional Patent Application Ser. No. 62/787,678, filed on Jan. 2, 2019 and U.S. Provisional Patent Application Ser. No. 62/816,897, filed on Mar. 11, 2019 and U.S. Provisional Patent Application Ser. No. 62/905,367, filed on Sep. 24, 2019, the disclosures of the aforementioned patent applications are hereby incorporated by reference in their entireties.

TECHNICAL FIELD

Embodiments of the present application generally relate to the field of picture processing and more particularly to inter prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video might be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

In a first aspect of the present application, a prediction method for an image block, wherein a current block comprising a first prediction sub-block and a second prediction sub-block, the prediction method comprising: parsing a first index from a bitstream, wherein the first index is used to obtain prediction information of the first prediction sub-block; parsing a second index from the bitstream; comparing the first index with the second index; adjusting the second index in the event that the second index is equal to or greater than the first index; and obtaining prediction information of the second prediction sub-block according to the adjusted second index.

In an embodiment, wherein adjusting the second index comprising: incrementing the second index by m, wherein m is a positive integer.

In an embodiment, wherein m is one.

In an embodiment, wherein before parsing a first index from a bitstream, the prediction method further comprising: parsing at least one indicator to determine a prediction mode of the current block, wherein the prediction mode is a triangle prediction mode, or a geometric prediction mode. The prediction mode might be other sub-block based prediction mode, including rectangular or non-rectangular (trapezoid) mode. And the triangle prediction mode and the geometric prediction mode might be unified as a single prediction mode, which might also be involved in the feasible implementation.

In an embodiment, wherein the prediction method further comprising: obtaining a candidate list for the current block.

In an embodiment, wherein the prediction information of the first prediction sub-block is obtained from the candidate list according to the first index.

In an embodiment, wherein the prediction information of the second prediction sub-block is obtained from the candidate list according to the adjusted second index.

In an embodiment, wherein the candidate list is a candidate list of Merge Mode.

In an embodiment, wherein the prediction method further comprising: parsing a first number to determine a maximum allowed candidate index in the candidate list; and obtaining a maximum index based on the maximum allowed candidate index, wherein the first index is not greater than the maximum index.

In an embodiment, wherein obtaining the maximum index based on the maximum allowed candidate index, comprising: obtaining the maximum index by a calculation between the maximum allowed candidate index and a predetermined number.

In an embodiment, wherein obtaining the maximum index based on the maximum allowed candidate index, comprising: parsing a second number to derive a difference between the maximum allowed candidate index and the maximum index; and obtaining the maximum index by a calculation between the maximum allowed candidate index and the difference.

In an embodiment, wherein the prediction method further comprising: parsing a third number to determine the maximum index.

In an embodiment, wherein the maximum allowed candidate index is not less than the maximum index.

In an embodiment, wherein after obtaining prediction information of the second prediction sub-block according to the adjusted second index, the prediction method further comprising: obtaining a prediction value of the current block based one the prediction information of the first prediction sub-block and the prediction information of the second prediction sub-block.

In an embodiment, wherein the first index or the second index is binarized according to a truncated unary code.

In an embodiment, wherein a first bin of the binarized first index or second index is coded using regular coding mode of CABAC.

In an embodiment, wherein a non-first bin of the binarized first index or second index is coded using bypass coding mode of CABAC.

In an embodiment, wherein the prediction method further comprising: parsing a direction indicator from the bitstream, and wherein the direction indicator is used to indicate a splitting direction of the current block.

In a second aspect of the present application, a method for inter-prediction of a block of a picture, comprising: obtaining a prediction indicator; determining whether the prediction indicator indicates that a sub-block prediction is to be applied on the block; obtaining two different indicators when the predication indicator indicates that the sub-block prediction is to be applied on the block, wherein the two different indicators indicate separately two different entries in a motion information candidate list for two sub-blocks in the block; and performing inter-prediction for the block based on the two different indicators.

In an embodiment, wherein the operation of obtaining two different indicators further comprises: obtaining two initial indicators comprising an initial first indicator and an initial second indicator; comparing the initial second indicator with the initial first indicator; adjusting the initial second indicator to obtain an updated second indicator when the initial second indicator is greater than or equal to the initial first indicator, wherein the updated second indicator is different from the initial first indicator; and determining the initial first indicator and the updated second indicator as the two different indicators.

In an embodiment, wherein the operation of adjusting the initial second indicator to obtain an updated second indicator further comprises: incrementing the initial second indicator by m, wherein m is a pre-defined number and preferably is set to 1.

In an embodiment, wherein the method further comprises: setting the maximum value of the initial first indicator as M, and setting the maximum value of the initial second indicator as M-m, wherein M is not greater than N, and N is the size of motion information candidate list.

In an embodiment, wherein N is a positive integer that is determined based on an indicator signaled in a received bitstream.

In an embodiment, wherein the method further comprises: comparing the size of the block with a specified threshold; if the size of the block is not greater than the specified threshold, setting the maximum value of the initial first indicator as M, and setting the maximum value of the initial second indicator as M-m, wherein M is not greater than N, and N is the size of motion information candidate list; and if the size of the block is greater than the specified threshold, setting the maximum value of the initial first indicator as P, and setting the maximum value of the initial second indicator as P-m, wherein P is greater than M and not greater than N, and N is the size of motion information candidate list.

In an embodiment, wherein M and P are positive pre-defined integers.

In an embodiment, wherein if P is determined to be greater than N, P is updated to be equal to N, or if M is determined to be greater than N, M is updated to be equal to N.

In an embodiment, wherein the method further comprises: obtaining a single indicator when the predication indicator indicates that the sub-block prediction is not to be applied on the block, wherein the single indicator indicates an entry in a merge candidate list for the block; and performing inter-prediction for the block based on the single indicator.

In an embodiment, wherein the method further comprises: setting the maximum value of the initial first indicator as M, wherein N is the size of the merge candidate list which is not identical to the motion information candidate list.

In an embodiment, wherein the method further comprises: determining a splitting direction indicator, wherein the splitting direction indicator indicates a splitting direction for the block.

In an embodiment, wherein the operation of obtaining two different indicators further comprises: adjusting the initial second indicator to obtain an updated second indicator when the splitting direction indicator indicates a first splitting direction, wherein the updated second indicator is different from the initial first indicator; and determining the initial first indicator and the updated second indicator as the two different indicators; or adjusting the initial first indicator to obtain an updated first indicator when the splitting direction indicator indicates a second splitting direction, wherein the updated first indicator is different from the initial second indicator; and determining the updated first indicator and the initial second indicator as the two different indicators.

In an embodiment, wherein the method further comprises: selecting motion information from the motion information candidate list based on the two different indicators; and performing sub-block prediction for the current block based on the selected motion information.

In an embodiment, wherein the method further comprises: selecting a first motion information and a second motion information from the motion information candidate list according to the two different indicators; performing sub-block prediction for a first sub-block based on the first motion information; and performing sub-block prediction for a second sub-block based on the second motion information.

In an embodiment, wherein the first sub-block is assigned to the part whose geometric center is closer to the left boundary of the current block.

In an embodiment, wherein the method further comprises: binarizing the two different indicators according to a truncated unary code.

In an embodiment, wherein the method further comprises: coding first bin of an indicator of the two different indicators using coding mode of a context adaptive binary arithmetic coding (CABAC); and coding the other bin of the indicator of the two different indicators using by-pass mode of CABAC.

In a third aspect of the present application, a decoding method for a block, wherein a current block includes a first sub-unit and a second sub-unit, comprising: parsing a first indicator, wherein the first indicator is used to determine a partition pattern of the current block; parsing a second indicator and a third indicator; determining prediction information of the first sub-unit based on a value of the second indicator; determining a value of the third indicator, wherein in a case that the value of the third indicator is equal to or greater than the second indicator, the value of the third indicator is added by a target value; and determining prediction information of the second sub-unit based on the determined value of the third indicator.

In an embodiment, wherein the maximum allowed value of the second indicator is M, and the maximum allowed value of the third indicator is M-m, and wherein M is an positive integer and m is a preset positive integer.

In an embodiment, wherein a number of entry in a prediction information candidate list is N.

In an embodiment, wherein M is equal to or less than N.

In an embodiment, wherein M is greater than or equal to N.

In an embodiment, wherein further comprising: parsing a fourth indicator, wherein the fourth indicator is used to indicate a value of N.

In an embodiment, wherein N is a predetermined value.

In an embodiment, wherein further comprising: parsing a fifth indicator, wherein the fifth indicator is used to indicate a value of M.

In an embodiment, wherein the value of M is determined by the value of N.

In a fourth aspect of the present application, an apparatus for inter prediction, wherein a current block comprising a first prediction sub-block and a second prediction sub-block, the apparatus comprising: a parsing module, configured to parse a first index from a bitstream, wherein the first index is used to obtain prediction information of the first prediction sub-block; and parse a second index from the bitstream; a locating module, configured to compare the first index with the second index; and adjust the second index in the event that the second index is equal to or greater than the first index; and an obtaining module, configured to obtain prediction information of the second prediction sub-block according to the adjusted second index.

In an embodiment, wherein the locating module is configured to: increment the second index by m, wherein m is a positive integer.

In an embodiment, wherein m is one.

In an embodiment, wherein before parsing a first index from a bitstream, the parsing module is further configured to: parse at least one indicator to determine a prediction mode of the current block, wherein the prediction mode is a triangle prediction mode or a geometric prediction mode. The prediction mode might be other sub-block based prediction mode, including rectangular or non-rectangular (trapezoid) mode. And the triangle prediction mode and the geometric prediction mode might be unified as a single prediction mode, which might also be involved in the feasible implementation.

In an embodiment, wherein the locating module is further configured to: obtain a candidate list for the current block.

In an embodiment, wherein the prediction information of the first prediction sub-block is obtained from the candidate list according to the first index.

In an embodiment, wherein the prediction information of the second prediction sub-block is obtained from the candidate list according to the adjusted second index.

In an embodiment, wherein the candidate list is a candidate list of Merge Mode.

In an embodiment, wherein the parsing module is configured to: parse a first number to determine a maximum allowed candidate index in the candidate list; and obtain a maximum index based on the maximum allowed candidate index, wherein the first index is not greater than the maximum index.

In an embodiment, wherein the parsing module is configured to: obtain the maximum index by a calculation between the maximum allowed candidate index and a predetermined number.

In an embodiment, wherein the parsing module is configured to: parse a second number to derive a difference between the maximum allowed candidate index and the maximum index; and obtain the maximum index by a calculation between the maximum allowed candidate index and the difference.

In an embodiment, wherein the parsing module is configured to: parse a third number to determine the maximum index.

In an embodiment, wherein the maximum allowed candidate index is not less than the maximum index.

In an embodiment, wherein after obtaining prediction information of the second prediction sub-block according to the adjusted second index, the obtaining module is further configured to: obtain a prediction value of the current block based one the prediction information of the first prediction sub-block and the prediction information of the second prediction sub-block.

In an embodiment, wherein the first index or the second index is binarized according to a truncated unary code.

In an embodiment, wherein a first bin of the binarized first index or second index is coded using regular coding mode of CABAC.

In an embodiment, wherein a non-first bin of the binarized first index or second index is coded using bypass coding mode of CABAC.

In an embodiment, wherein the parsing module is configured to parse a direction indicator from the bitstream, and wherein the direction indicator is used to indicate a splitting direction of the current block.

In a fifth aspect of the present application, a computer program product comprising program code for performing the method according to any one of the first aspect to the fourth aspect when executed on a computer or a processor.

In a sixth aspect of the present application, a decoder, comprising: one or more processors; and a non-transitory computer-readable storage medium coupled to the processors and storing programming for execution by the processors, wherein the programming, when executed by the processors, configures the decoder to carry out the method according to any one of the first aspect to the fourth aspect.

In a seventh aspect of the present application, an encoder, comprising: one or more processors; and a non-transitory computer-readable storage medium coupled to the processors and storing programming for execution by the processors, wherein the programming, when executed by the processors, configures the encoder to carry out the method according to any one of the first aspect to the fourth aspect.

In an eighth aspect of the present application, a non-transitory computer-readable medium carrying a program code which, when executed by a computer device, causes the computer device to perform the method of any one of the first aspect to the fourth aspect.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

Details of one or more embodiments are set forth in the accompanying drawings and the description below. Other features, objects, and advantages will be apparent from the description, drawings, and claims.

It is noted that in the present application, for a triangle prediction mode, since comparing with the prediction mode that the whole block has unify prediction information, the case that two prediction sub-blocks in said block have the same prediction information is redundancy. The present application designs a prediction index coding method to avoid the redundant case. The bits for signaling the prediction index are saved, and the coding efficiency is improved. And the maximum quantity of candidate prediction information for the triangle prediction mode is derived based on the maximum quantity of candidate prediction information for Merge Mode. The coding bits are also saved, comparing with the maximum quantity of candidate prediction information for the triangle prediction mode is signaled independently.

BRIEF DESCRIPTION OF THE DRAWINGS

In the following embodiments of the disclosure are described in more detail with reference to the attached figures and drawings, in which.

Figure 1A:
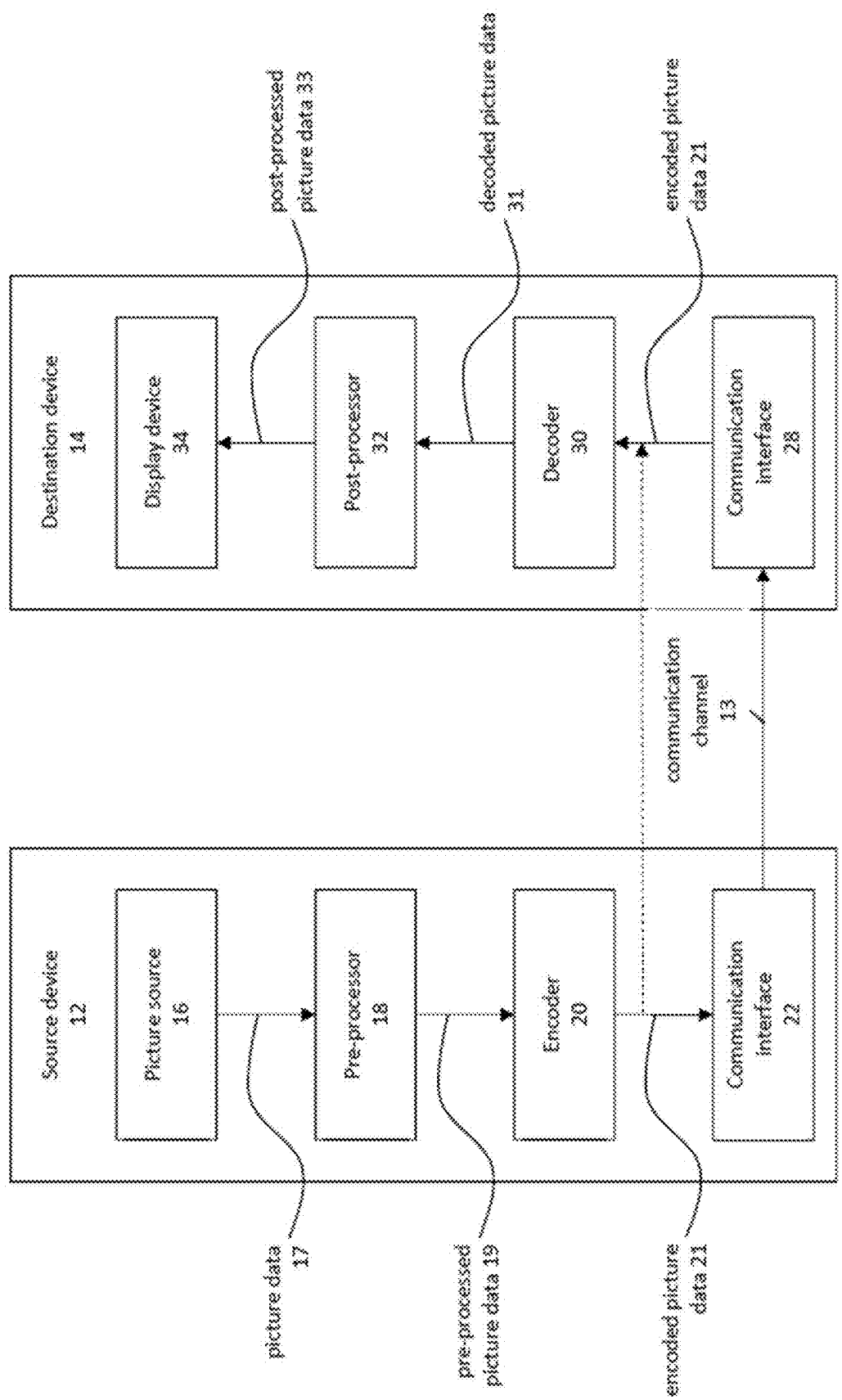
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures might be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It might be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
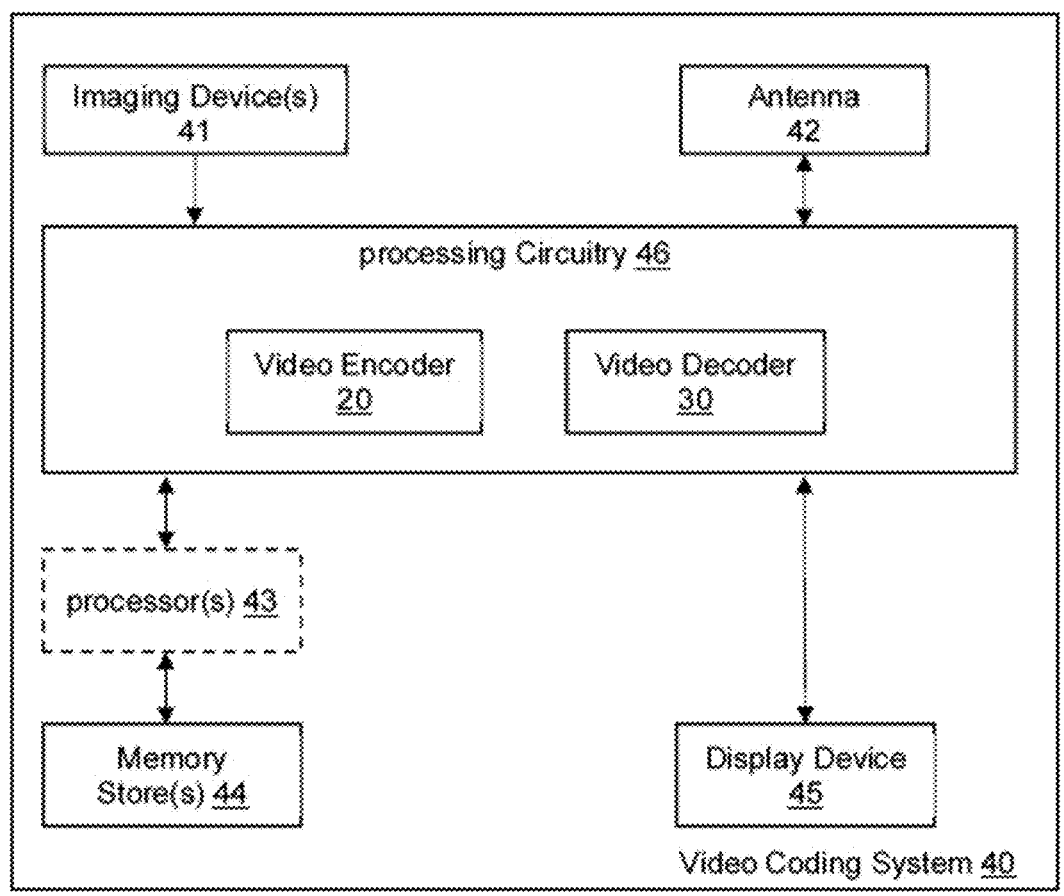
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
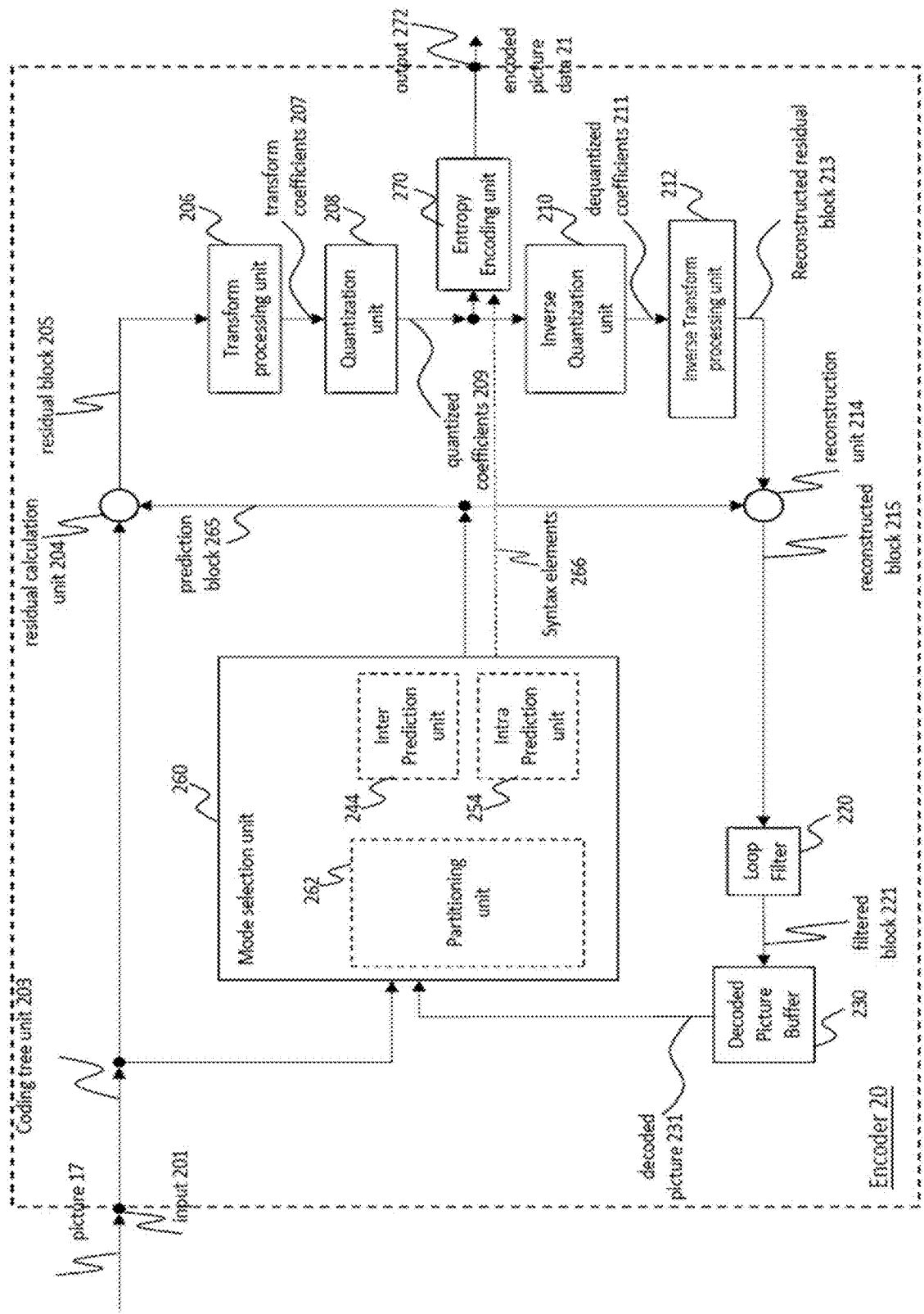
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
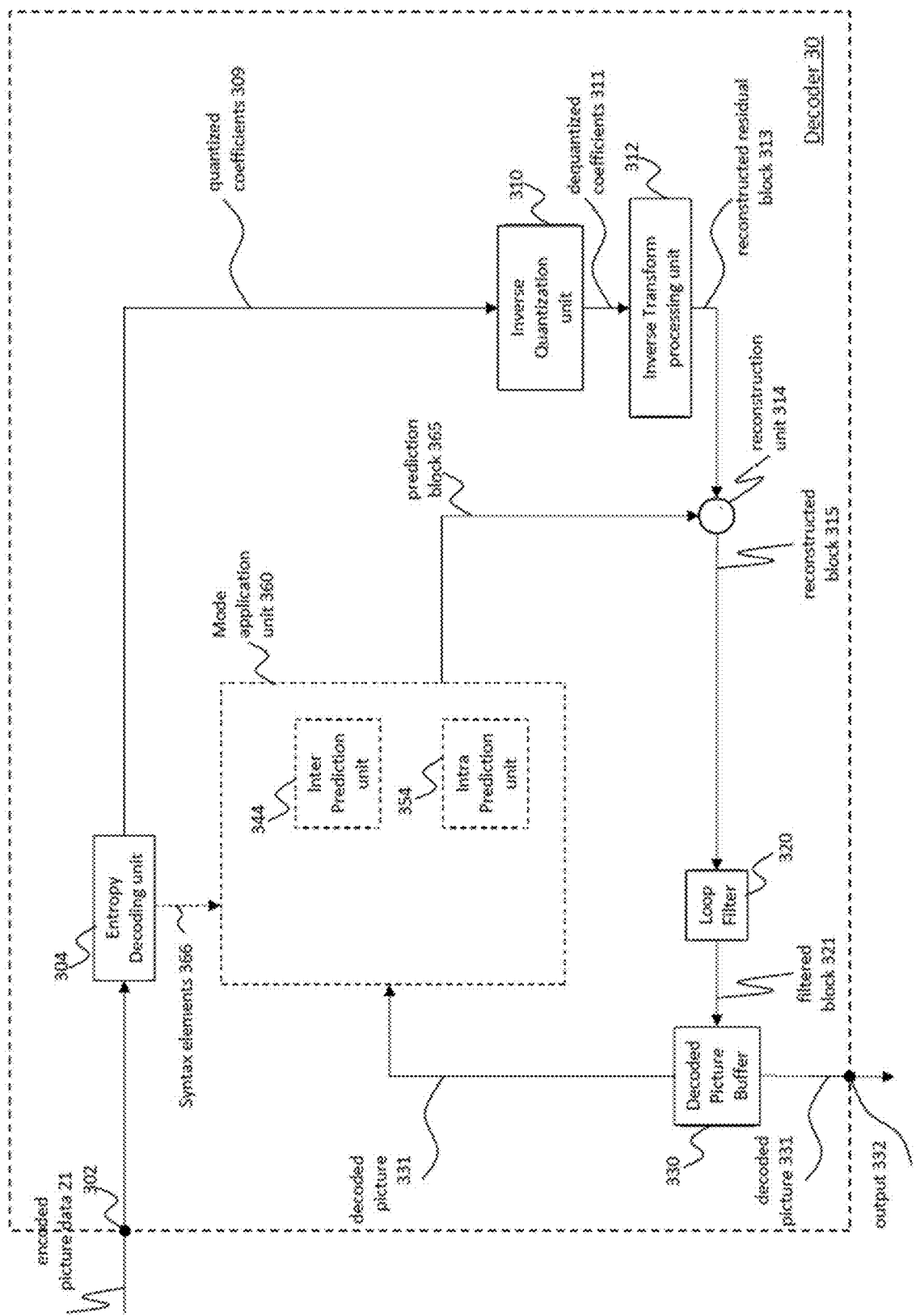
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or might be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or might be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it might be specified to be value rather than 128×128 in the future, for example, 256×256. The CTUs of a picture may be clustered/grouped as slices/tile groups, tiles or bricks. A tile covers a rectangular region of a picture, and a tile might be divided into one or more bricks. A brick consists of a number of CTU rows within a tile. A tile that is not partitioned into multiple bricks might be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU might be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU might be partitioned into transform units (TUs) according to another quadtree structure similar to the coding tree for the CU.

Figure 6:
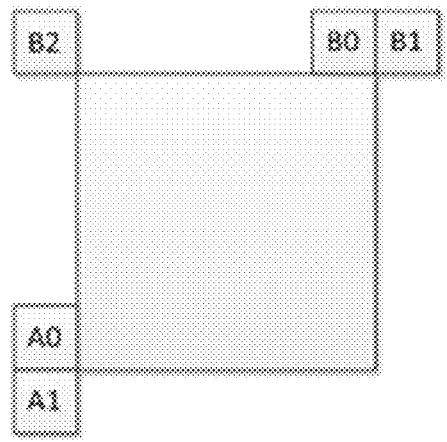
FIG. 6 is a diagram showing an example of positions of spatial merge candidate according to an embodiment.

In embodiments, e.g., according to the latest video coding standard currently in development, which is referred to as Versatile Video Coding (VVC), a combined Quad-tree nested multi-type tree using binary and ternary splits segmentation structure, for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes might be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is less than the width or height of the colour component of the CU.VVC develops a unique signaling mechanism of the partition splitting information in quadtree with nested multi-type tree coding tree structure. In the signaling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU might be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is greater than 64, as shown in FIG. 6. TT split is also forbidden when either width or height of a chroma coding block is greater than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size might be set to maximum transform block (TB) size. However, in VVC, ternary tree (TT) and binary tree (BT) partition may lead to the increasing of VPDUs sizes.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU might be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which might be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 might be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 might be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is −32768~32767; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here two methods are provided for constraining the motion vector according to the bitDepth.

Figure 4:
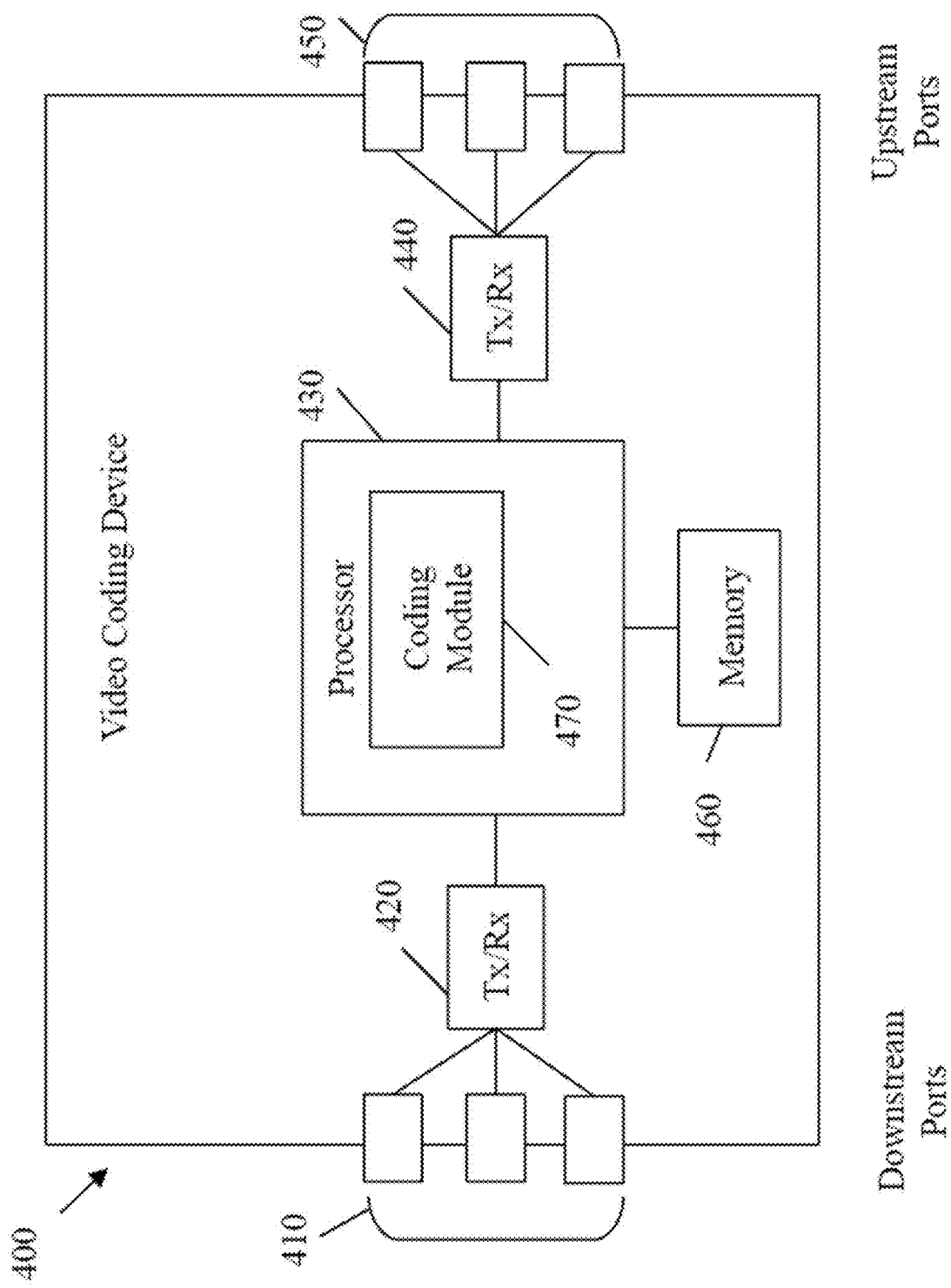
FIG. 4 is a block diagram illustrating an example of an encoding apparatus or a decoding apparatus according to an embodiment.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
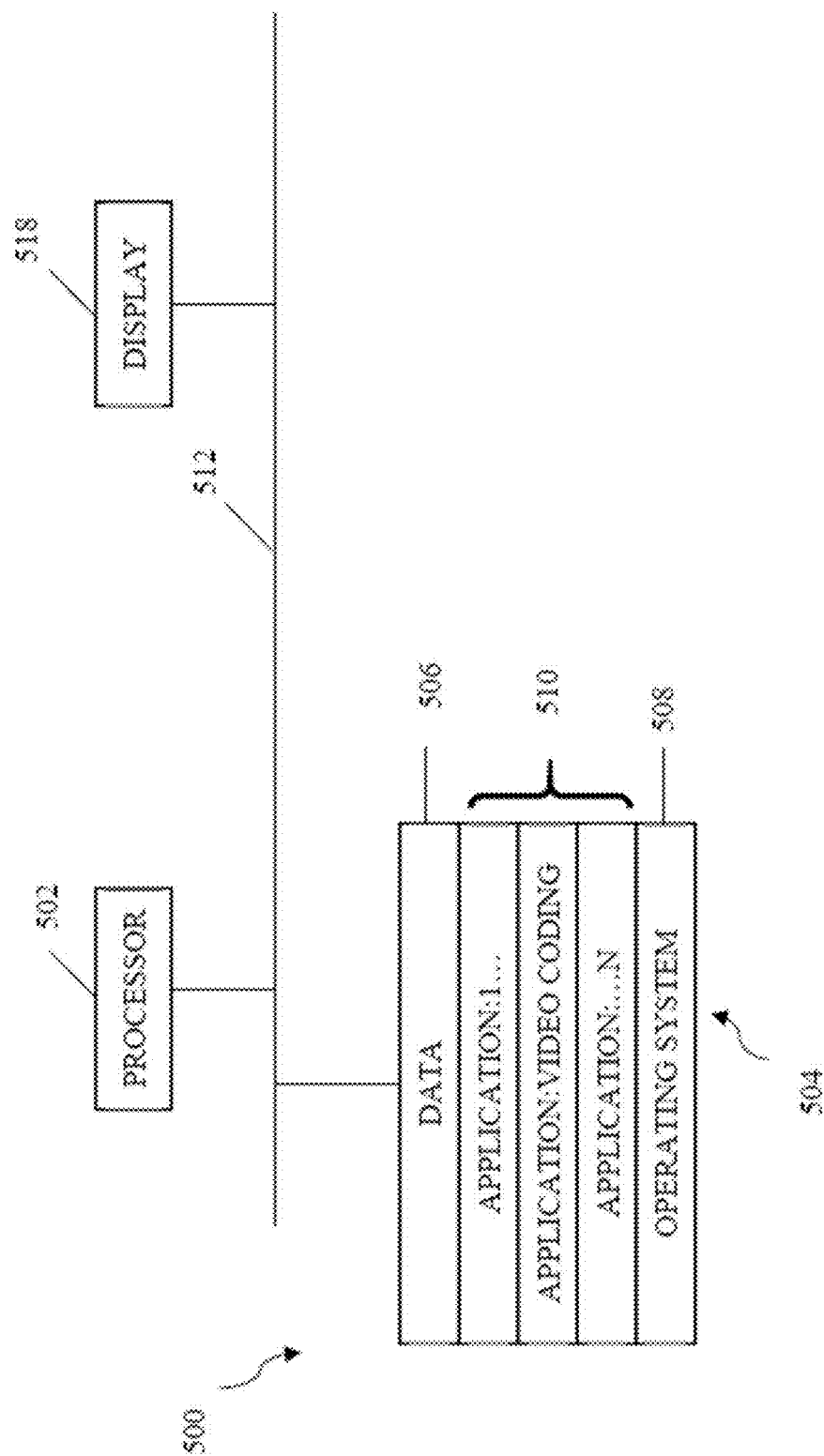
FIG. 5 is a block diagram illustrating another example of an encoding apparatus or a decoding apparatus according to an embodiment.

FIG. 5 is a simplified block diagram of an apparatus 500 that may be used as either or both of the source device 12 and the destination device 14 from FIG. 1 according to an exemplary embodiment.

A processor 502 in the apparatus 500 might be a central processing unit. Alternatively, the processor 502 might be any other type of device, or multiple devices, capable of manipulating or processing information now-existing or hereafter developed. Although the disclosed implementations might be practiced with a single processor as shown, e.g., the processor 502, advantages in speed and efficiency might be achieved using more than one processor.

A memory 504 in the apparatus 500 might be a read only memory (ROM) device or a random access memory (RAM) device in an implementation. Any other suitable type of storage device might be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 might be coupled to the processor 502 via the bus 512.

Although depicted here as a single bus, the bus 512 of the apparatus 500 might be composed of multiple buses. Further, the secondary storage 514 might be directly coupled to the other components of the apparatus 500 or might be accessed via a network and can comprise a single integrated unit such as a memory card or multiple units such as multiple memory cards. The apparatus 500 can thus be implemented in a wide variety of configurations.

Some techniques which might be implemented with the current solution of this application are introduced as following:

Merge Candidate List

The process of constructing the merge motion candidate list is introduced by ITU-T H.265 standard. In another embodiment, the merge motion candidate list is used by extended merge prediction of Versatile Video Coding (VVC).

Block merging operation is a special mode (also called as "Merge mode") for motion data coding. Block merging operation allows a current block using the same motion information of a neighbor block. Motion information contains motion data, and the motion data includes the information whether one or two reference picture lists are used, as well as a reference index and a motion vector for each reference picture list. Block merging operation is especially useful if two neighboring blocks correspond to a same non-deformable object in the picture frame. In this case the two blocks might be predicted using the same motion vectors and same reference picture, hence the whole motion information is identical for both blocks.

In an implementation, after checking whether a neighboring block is available and contains motion information, some additional redundancy checks are performed before taking all the motion data of the neighboring block as a motion information candidate.

In an implementation, the merge candidate list is constructed by including the following five types of candidates in order:

1) Spatial MVP from spatial neighbor CUs
2) Temporal MVP from collocated CUs
3) History-based MVP from an FIFO table
4) Pairwise average MVP
5) Zero MVs.

The size of merge list is signaled in slice header and the maximum allowed size of merge list is 6, for example. For each CU code in merge mode, an index of best merge candidate is encoded.

The generation process of each category of merge candidates is provided:

Spatial Candidate Derivation

Figure 7:
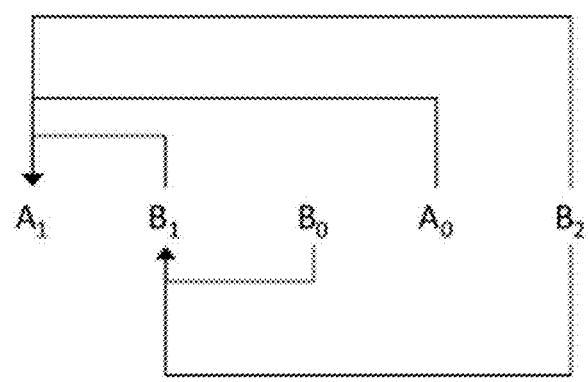
FIG. 7 is a diagram showing an example of candidate pairs considered for redundancy check of spatial merge candidates according to an embodiment.

In an implementation, a maximum of four merge candidates are selected among candidates located in the positions depicted in FIG. 6. The order of derivation is B1, A1, B0, A0 and B2. Position B2 is considered only when any CU of position A0, B0, B1, A1 is not available (e.g. because it belongs to another slice or tile) or is intra coded. After candidate at position B1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 7 are considered and a candidate is only added to the list if the corresponding candidate used for redundancy check has not the same motion information.

During the implementations, the order, the position and the number of spatial neighbors that are considered as changeable, the above example could not be regarded as restriction.

Temporal Candidate Derivation

Figure 8:
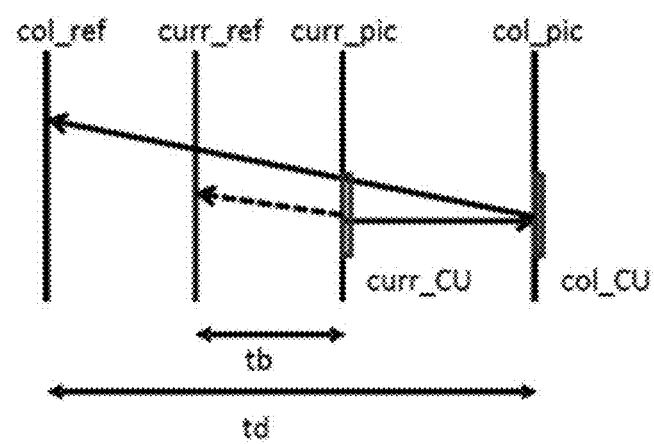
FIG. 8 is a diagram showing an example of the motion vector scaling for temporal merge candidate according to an embodiment.

In an implementation, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 8, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 9:
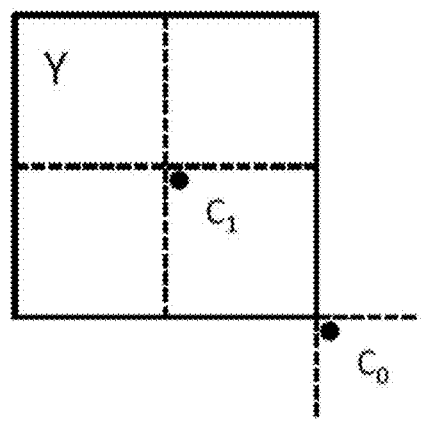
FIG. 9 is a diagram showing an example of positions for the temporal candidate according to an embodiment.

The position for the temporal candidate is selected between candidates C0 and C1, as depicted in FIG. 9. If CU at position C0 is not available, is intra coded, or is outside of the current row of CTUs, position C1 is used. Otherwise, position C0 is used in the derivation of the temporal merge candidate.

History-based merge candidate derivation

The history-based MVP (HMVP) merge candidates are added to merge list after the spatial MVP and TMVP. In an implementation, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 5, which indicates up to 5 History-based MVP (HMVP) candidates may be added to the table, for example. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, different simplifications might be introduced. Generally, once the total number of available merge candidates reaches the maximally allowed merge candidates minus 1, the merge candidate list construction process from HMVP is terminated.

Pair-Wise Average Merge Candidate Derivation

Pairwise average candidates are generated by averaging predefined pairs of candidates in the existing merge candidate list, and the predefined pair is defined as (0, 1), for example, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

A list of motion information candidates is output during a merge candidate list construction process. The term "motion information" refers to the collected information that is necessary to perform inter prediction process. The motion information usually refers to the following information:

1) Whether the block applies uni-prediction or bi-prediction (prediction direction).

2) Motion vector (2 motion vectors if block applies bi-prediction)

3) The reference picture index that is used in the prediction. (2 indexes if block applies bi-prediction, each index corresponds to one reference picture list, the first reference picture list (L0) or the second reference picture list (L1)).

In some feasible implementation, the motion information might also refer to switchable interpolation filter index, which is used to indicate a specific interpolation filter for the motion compensation of an inter prediction unit.

In the present application, motion information might be one or more above items or any other information that is necessary to perform inter prediction process according to the different embodiments.

The reference picture index is used to indicate the entry in the reference picture list that is used in the prediction process of a coding block. For example, the first motion vector may point to a first picture in L0 and the second motion vector might point to the first picture in L1. Two reference picture lists might be maintained and the picture pointed by the first motion vector is selected from L0 and the picture pointed by the second motion vector is selected from L1.

Each of the reference picture lists L0 and L1 might include one or more reference pictures, each of which is identified with a picture order count (POC). The association with each reference index and the POC value might be signaled in the bitstream. As an example the L0 and L1 reference picture lists might include the following reference pictures:

| Reference Picture List | Reference Index | POC |
|---|---|---|
| L0 | 0 | 12 |
| L0 | 1 | 13 |
| L1 | 0 | 13 |
| L1 | 1 | 14 |

In the example above, the first entry (indicated by reference index 0) in reference picture list L1 is the reference picture with POC value 13.

POC is a variable that associated with each picture, uniquely identifies the associated picture among all pictures in the Coded Video Sequence (CVS), and, when the associated picture is to be output from the decoded picture buffer, indicates the position of the associated picture in output order relative to the output order positions of the other pictures in the same CVS that are to be output from the decoded picture buffer.

Triangular Prediction Mode

Figure 10A:
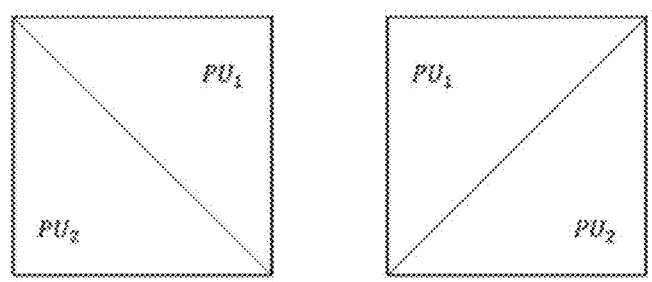
FIG. 10A is an illustration of splitting a block into two triangular prediction units according to an embodiment.
Figure 10B:
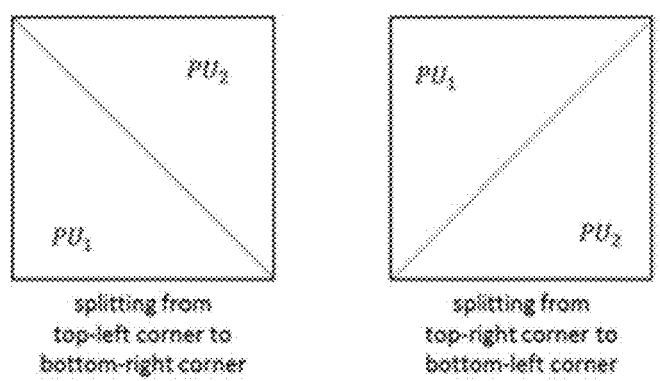
FIG. 10B is another illustration of splitting a block into two triangular prediction units according to an embodiment.

When triangular prediction mode (TPM) is used, a CU is split evenly into two triangle-shaped partitions, using either the diagonal split or the anti-diagonal split, as shown in FIG. 10A or FIG. 10B. It is noted that either FIG. 10A or FIG. 10B is an example. The positions of $PU_1$ and $PU_2$ are not limited in the present application. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived directly from the merge candidate list constructed for extended merge prediction described above.

Figure 11:
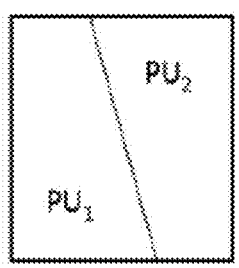
FIG. 11 are examples of other sub-block partition schemes according to an embodiment.
Figure 11:
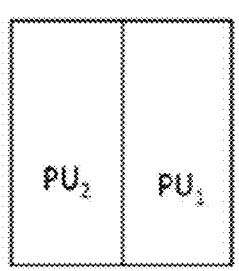
Figure 11:
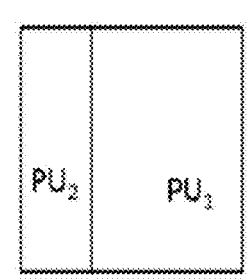

If triangle partition mode is used for a current CU, then a flag indicating the direction of the triangle partition (diagonal or anti-diagonal), and two merge indices (one for each partition) are further signaled. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units. TPM is a special case of sub-block partitioning, where a block is divided into two blocks. In the above example, two block division directions are illustrated (45 degree and 135 degree partitions.) However, it is noted that other partition angles and partition proportions are also possible, as exemplified in FIG. 11. As an example, the sub-blocks can be rectangular (for example, the middle and the right figures of FIG. 11) or non-rectangular (trapezoid, for example, the left figure of FIG. 11) depending on the partition angle. In some examples, a current block consists of two prediction units, and the two prediction units are split by a virtual splitting line. In this case, it is called that the current block is predicted by a geometric prediction mode. And for an example, the virtual splitting line might be a straight line, which is a boundary between the first sub-block and the second sub-block.

More specifically, the procedure of prediction using the TPM, comprising:

Uni-Prediction Candidate List Construction

Figure 12:
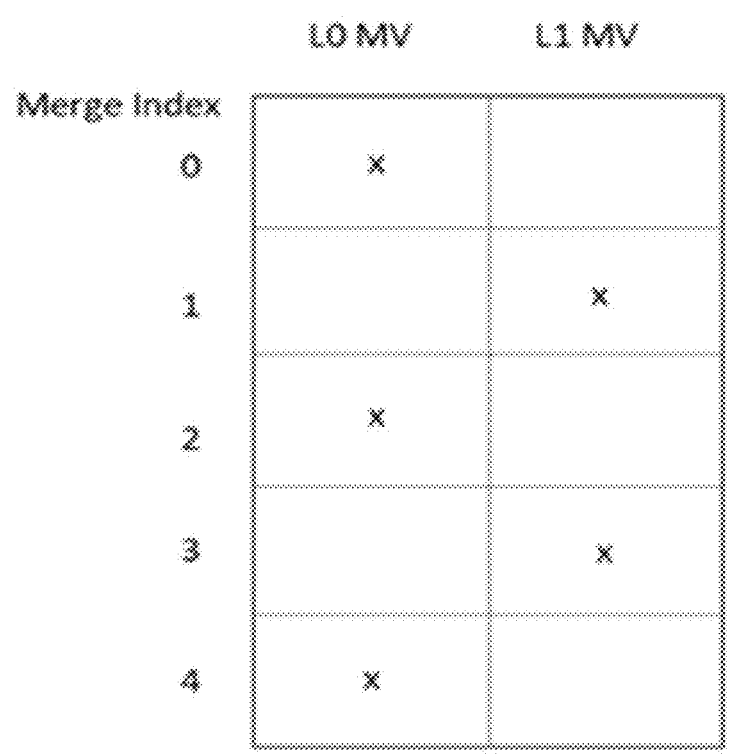
FIG. 12 is an illustration of deriving uni-prediction motion vector from the merge candidate list according to an embodiment.

Given a merge candidate index, the uni-prediction motion vector is derived from the merge candidate list constructed for extended merge prediction, as exemplified in FIG. 12. For a candidate in the list, its LX motion vector with X equal to the parity of the merge candidate index value, is used as the uni-prediction motion vector for triangle partition mode. These motion vectors are marked with "x" in FIG. 12. In case a corresponding LX motion vector does not exist, the L(1−X) motion vector of the same candidate in the extended merge prediction candidate list is used as the uni-prediction motion vector for triangle partition mode.

It is noted that In an embodiment, the uni-prediction motion vector can be derived from the merge candidate list, which is used for the regular merge mode (Merge Mode), directly, without explicit constructing of a special separate Uni-prediction candidate list.

Blending Along the Triangle Partition Edge

Figure 13:
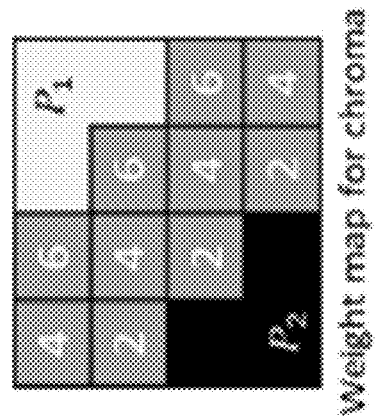
FIG. 13 is an example of a block applying the blending filter according to an embodiment.
Figure 13:
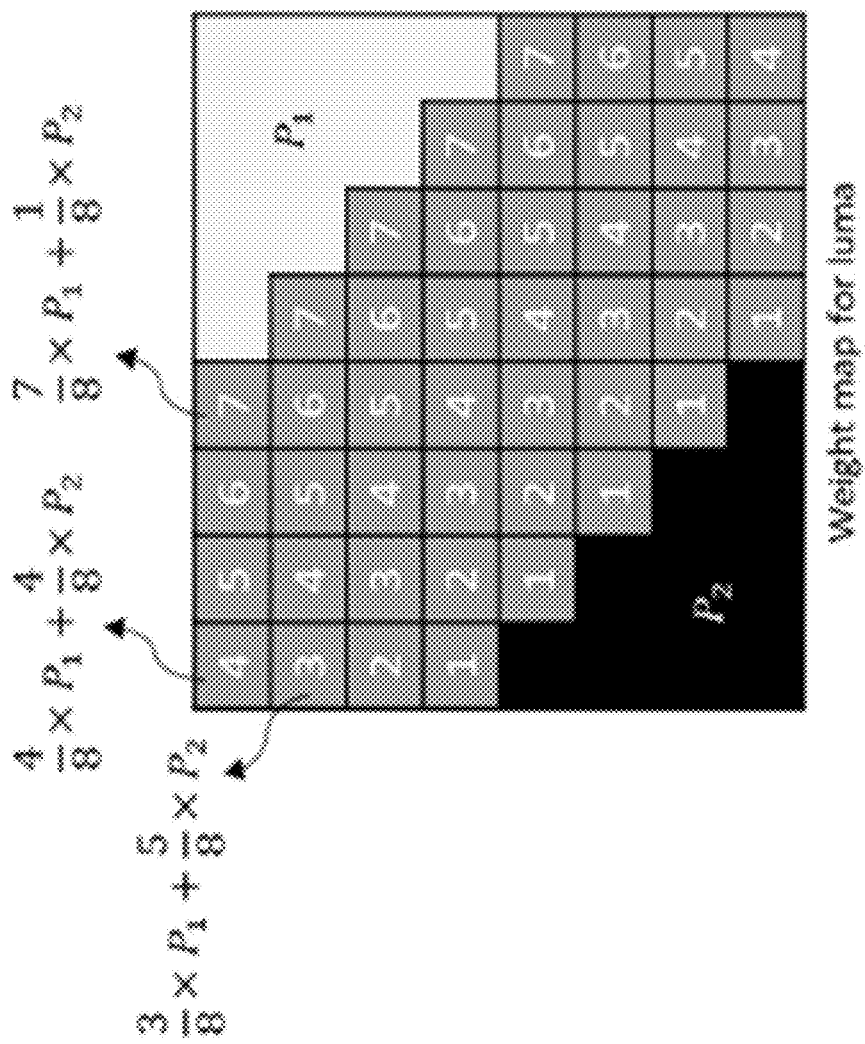

After predicting each triangle partition using its own motion, blending is applied to the two prediction signals to derive samples around the diagonal or anti-diagonal edge. The following weights are used in the blending process:

$\{7/8, 6/8, 5/8, 4/8, 3/8, 2/8, 1/8\}$ for luma and $\{6/8, 4/8, 2/8\}$ for chroma, as shown in FIG. 13.

Comparing with the regular prediction mode, motion information of the different sub-blocks need to be signaled for a block. Hence, the overhead of side information, which is used to represent the motion information, in sub-block prediction mode is higher. For improving the efficiency of coding the side information for the sub-block prediction mode, different embodiments are introduced in the present application.

Embodiment 1

If a sub-block prediction is determined to apply for a block:
1. An initial first index is included in the bitstream (in the encoder side) that may have a maximum value of M (M is an integer and M ≤ N, N is the quantity of candidates in the motion information candidate list).
2. An initial second index is included in the bitstream (in the encoder side) that may have a maximum value of M−m (m is an integer and m<M, m is a pre-defined value).
3. If value of the initial second index is greater or equal to value of the initial first index, the value of initial second index is incremented by a pre-defined number to obtain an updated second index (for example, the pre-defined number may be one).
4. The first sub-block part of the block is predicted by application of the motion candidate information which is determined based on the initial first index.
5. The second sub-block part of the block is predicted by application of the motion candidate information which is determined based on the updated second index.

In an embodiment, the initial first index and the initial second index may be included in the bitstream by the encoder and may be parsed by the decoder. In an embodiment, the operation of incrementing the initial second index by m is performed in both encoder side and decoder side, this operation aims to keep consistence between the encoder side and the decoder side.

In an embodiment, the initial first index and the updated second index are used to select entries in a motion information candidate list (based on the initial first index and the updated second index as entries, corresponding motion information candidates may be selected), and the selected motion information candidates are used for the first sub-block part (e.g. $PU_1$ in FIG. 10A or FIG. 10B) and the second sub-block part (e.g. $PU_2$ in FIG. 10A or FIG. 10B) of a block to perform the prediction.

In an embodiment, the motion information candidate list might be composed of only uni-prediction motion information candidates. It is noted that the merge candidate list (such as merge candidate list of ITU-T H.265) might be composed of uni-prediction and bi-prediction motion information candidates. Therefore the motion information candidate list used in the embodiment might be different from the merge candidate list of ITU-T H.265.

The motion information candidate list might be not identical to the merge candidate list, since the merge candidate list might include bi-prediction candidates, which are prohibited to be used when a block is determined to apply sub-block (e.g. triangular) prediction. In this case each sub-block must apply a uni-prediction motion information, hence the initial first index and the updated second index point to entries in a motion information candidate list that only includes uni-prediction candidates. The motion information candidates list might be constructed by using the same spatial and temporal neighbor blocks that are used in the construction of the merge candidate list. In another example the motion information candidates list might be constructed based on the merge candidate list by converting the bi-prediction candidates in the merge candidate list into uni-prediction candidates.

It is noted that the initial first and the initial second index does not need to follow a particular order in the bitstream structure.

It is noted that comparison operations between the initial first index and the initial second index are performed in both the encoder and the decoder. For the encoder side, the indicators (e.g. the initial first index and the initial second index) are included into the bitstream. For the decoder side, the indicators (e.g. the initial first index and the initial second index) are parsed from the bitstream.

The value of the initial second index is incremented by a pre-defined number (e.g. one) if the value of initial second index is greater than or equal to the value of the initial first index. Generally, a same motion information candidate list (composed of motion information candidates) is used and if the two indices point to the same motion information in the motion information candidate list, this would correspond to having a single motion information for the whole block. Therefore the initial second index is incremented by one to prevent obtaining the same index. If the initial second index is not incremented, the first and the second indices might point to the same motion candidate in the motion information candidate list (since the same list is used to select motion information of both sub-block parts). In this case each sub-block part would apply the same motion information for prediction, which means that there is no point of splitting a block into two sub-blocks. The redundant representation by incrementing the initial second index is avoided if the value of the initial second index is same or greater than the initial first index. Accordingly, it is noted that the motion information candidate list includes at least two sets of motion information. As a result of eliminating the redundant motion information representation of the sub-blocks by means of the disclosure, the compression efficiency is improved.

It is noted that the initial second index might be incremented by a pre-defined number (e.g. one, two, three, and so on) even if the result of incrementing operation does not exceed the quantity of candidates in the motion information candidate list.

In a specific implementation of the first embodiment, assuming a motion information candidate list includes motion information candidates with 6 entries. Further assuming that the first motion candidate in the motion information candidate list is applied to the first sub-block part of the block for prediction and the fifth motion candidate in the motion information candidate list is applied to the second sub-block part of the block for prediction.

In the encoder side:
1. A value of 0 is included (or signaled) in the bitstream to indicate the value of the initial first index. (Index value 0 corresponds to first entry in the motion information candidate list, value 1 corresponds to second entry, and so on.)
2. A value of 3 is included (or signaled) in the bitstream to indicate the value of the initial second index.
3. The value of updated second index is calculated by incrementing the value of the initial second index by, for example, one, hence the value 4 is obtained.
4. The initial first index is determined to point to the first motion candidate in a motion information candidate list. It is applied to predict the first sub-block part of the block.
5. The updated second index is determined to point to the fifth motion candidate in the motion information candidate list. It is applied to predict the second sub-block part of the block.

In the decoder side:
1. A value of 0 is parsed from the bitstream to indicate the value of the initial first index.
2. A value of 3 is parsed from the bitstream to indicate the value of the initial second index.

3. The value of updated second index is calculated by incrementing its value by for example, one (since 3 is greater than 0), hence the value 4 is obtained.
4. The initial first index is determined to point to the first motion candidate in the motion information candidate list. It is applied to predict the first sub-block part of the block.
5. The updated second index is determined to point to the fifth motion candidate in the motion information candidate list. It is applied to predict the second sub-block part of the block.

From this implementation, in the encoder side, the initial second index is also updated by incrementing by one, this operation aims to keep consistence with the similar operation in decoder side.

It is understandable that the incrementing number may be a pre-defined number, for example, 1, 2, 3, and so on, even if the result of incrementing operation does not exceed the quantity of candidates in the motion information candidate list.

In another specific implementation of the first embodiment, assuming the motion information candidate list comprises 3 entries which are as follows:

(1) First motion information candidate ($1^{st}$ candidate)
(2) Second motion information candidate ($2^{rd}$ candidate)
(3) Third motion information candidate ($3^{rd}$ candidate)

The values of the first and the second index are as follows:

| Value of the index Y that is included in (parsed from) the bitstream | Value of the index Z that is used to select the entry in the motion information candidate list | Motion information applied by the Sub-block part X | | | |
|---|---|---|---|---|---|
| Y = First index | Y = Second index | Z = First index | Z = Second index | X = First sub-block part | X = Second sub-block part |
| 0 | 0 | 0 | 1 (incremented) | $1^{st}$ candidate | $2^{nd}$ candidate |
| 0 | 1 | 0 | 2 (incremented) | $1^{st}$ candidate | $3^{rd}$ candidate |
| 1 | 1 | 1 | 2 (incremented) | $2^{nd}$ candidate | $3^{rd}$ candidate |
| 1 | 0 | 1 | 0 | $2^{nd}$ candidate | $1^{st}$ candidate |
| 2 | 0 | 2 | 0 | $3^{rd}$ candidate | $1^{st}$ candidate |
| 2 | 1 | 2 | 1 | $3^{rd}$ candidate | $2^{nd}$ candidate |

From above table, the maximum value for the first index is 3, and the maximum value for the second index is 2. From the table, if the initial second index is greater than the initial first index, the initial second index is still incremented by 1. This is to keep a unify operation (for example, incrementing by one) for the scenarios when the initial second index is greater than or equal to the initial first index. Take the first to third rows in above table for example, for the first and third rows, the initial first index and the initial second index are equal, to make them different, the initial second index is incremented by 1. For the second row, the initial second index is greater than the initial first index, if no incrementing operation is performed, this will be an exception, and will improve the complexity. To make it simple, when determining the initial second index is greater than the initial first index, the initial second index is still incremented by 1.

Embodiment 2

If a sub-block prediction is determined to apply for a block:
1. An indicator that indicates the splitting direction is included in the bitstream.
2. An initial first index is included in the bitstream that may have a maximum value of M (M is an integer and M≤N, N is the quantity of candidates in the motion information candidate list).
3. An initial second index is included in the bitstream that may have a maximum value of M−m (m is an integer and m≤M, m is a pre-defined value).
4. If value of the initial second index is greater or equal to value of the initial first index, the value of initial second index is incremented by a pre-defined number to obtain an updated second index (for example, the pre-defined number may be one).
5. The first sub-block part of the block is predicted by application of the motion candidate information which is determined based on the initial first index.
6. The second sub-block part of the block is predicted by application of the motion candidate information which is determined based on the updated second index.

It is noted that the splitting direction indication, the initial first index and the initial second index do not need to follow a particular order in the bitstream structure.

In an embodiment, there might be two splitting directions which might be:
(1) Splitting from top-left corner to bottom-right corner of the block (see left figure in FIG. 10A or FIG. 10B)
(2) Splitting from top-right corner to bottom-left corner of the block (see right figure in FIG. 10A or FIG. 10B)

In an embodiment, there might be four splitting directions which might be
(1) Splitting from top-left corner to bottom-right corner of the block
(2) Splitting from top-right corner to bottom-left corner of the block
(3) Splitting from center-top point to center-bottom point of the block
(4) Splitting from center-right point to center-left point of the block Embodiment 3

If a sub-block prediction is determined to apply for a block:
1. An indicator that indicates the splitting direction is included in the bitstream.
2. If the indicator indicates a specific splitting direction (for example, splitting from top-left corner to bottom-right corner of the block, see left figure in FIG. 10A or FIG. 10B)
   2.1 An initial first index is included in the bitstream that may have a maximum value of M (M is an integer and M≤N, N is the quantity of candidates in the motion information candidate list).
   2.2 An initial second index is included in the bitstream that may have a maximum value of M-m (m is an integer and m<M, m is a pre-defined value).
   2.3. If value of the initial second index is greater or equal to value of the initial first index, the value of initial second index is incremented by a pre-defined number to obtain an updated second index (for example, the pre-defined number may be one).

3. Otherwise (If the indicator indicates a different splitting direction, for example, Splitting from top-right corner to bottom-left corner of the block (see right figure in FIG. 10A or FIG. 10B)
- 3.1 An initial first index is included in the bitstream that may have a maximum value of M-m (m is an integer and m<M, m is a pre-defined value).
- 3.2 An initial second index is included in the bitstream that may have a maximum value of M (M is an integer and M≤N, N is the quantity of candidates in the motion information candidate list).
- 3.3. If value of the initial second index is greater or equal to value of the initial first index, the value of initial second index is incremented by a pre-defined number to obtain an updated second index (for example, the pre-defined number may be one).

4. The first sub-block part of the block is predicted by application of the motion information candidate which is determined based on the first index.

5. The second sub-block part of the block is predicted by application of the motion information candidate which is determined based on the second index.

In an embodiment, there might be two splitting directions which might be
(1) Splitting from top-left corner to bottom-right corner of the block
(2) Splitting from top-right corner to bottom-left corner of the block In an embodiment, there might be four splitting directions which might be
(1) Splitting from top-left corner to bottom-right corner of the block
(2) Splitting from top-right corner to bottom-left corner of the block
(3) Splitting from center-top point to center-bottom point of the block
(4) Splitting from center-right point to center-left point of the block Embodiment 4

If a sub-block prediction is determined to apply for a block,

1. An indicator that indicates the splitting direction is included in the bitstream.

2. An initial first index is included in the bitstream that may have a maximum value of M (M is an integer and M≤N, N is the quantity of candidates in the motion information candidate list).

3. An initial second index is included in the bitstream that may have a maximum value of M-m (m is an integer and m<M, m is a pre-defined value).

4. If value of the initial second index is greater or equal to value of the initial first index, the value of initial second index is incremented by a pre-defined number to obtain an updated second index (for example, the pre-defined number may be one).

5. The first sub-block part of the block is predicted by application of the motion candidate information which is determined based on the initial first index.

6. The second sub-block part of the block is predicted by application of the motion candidate information which is determined based on the updated second index.

Where the first sub-block part is assigned to the part whose geometric center is closer to the left boundary of the block. Take FIG. 10A or FIG. 10B as an example, $PU_1$ denotes the first sub-block part whereas $PU_2$ denotes the second sub-block part.

In the embodiment 4, the index corresponding to the sub-block part that has a geometric center closer to the left boundary of the block is included in the bitstream first. The construction of motion information candidate list typically considers motion information of neighboring blocks in the following order: Motion information of left block, Motion information of top block, Motion information of top-right block . . . The above spatial neighbor order is taken from HEVC as an example. Since the motion information of left neighbor is considered first, the index that indicates the motion information of the left neighbor typically has fewer bits. Since the sub-block part that is closer (geometric mean-wise) to the left neighbor is coded first, and the second index cannot point to the same motion information (i.e. the same entry in the merge list), the total number of bits to represent the first index and the second index are typically lower. In another feasible implementation, the index corresponding to the sub-block part that has a geometric center closer to the top boundary of the block is included in the bitstream first. The order is not limited by the present application.

In a specific embodiment, assuming that the motion information candidate list has a size of 3 and it includes the following motion information candidates: Motion information of left neighboring block (first entry), Motion information of top neighboring block (second entry) and Motion information of collocated block (third entry, temporal neighbor block).

Further assuming that the splitting direction and the first sub-block ($PU_1$) and second sub-block ($PU_2$) are given as the left figure in FIG. 10A or FIG. 10B. Generally, it is more likely that the $PU_1$ will be predicted based on the first entry in the motion information candidate list (which corresponds to the motion information of the left neighbor block), and the $PU_2$ will be predicted based on the second entry in the motion information candidate list (which corresponds to the motion information of the top neighbor block) due to the spatial proximity.

According to an embodiment of the disclosure, the value of 0 is included (parsed in the decoder) in the bitstream to represent first index, and the value of 0 is included (parsed in the decoder) in the bitstream to represent second index (which are the smallest values that an index can assume) since the second index is equal to the first index, the second index is incremented by one before selecting the motion candidate from the motion information candidate list. In an embodiment, the first and the second indices have the smallest possible values according to the disclosure, which would require least number of total bits to represent the first index and the second index in the bitstream.

It is noted that the splitting direction indication, first index and the second index does not need to follow a particular order in the bitstream structure.

In a specific implementation, the sub-block prediction mode is triangular prediction mode. The first index (e.g. the initial first index) and the second index (e.g. the updated second index) are used to select the motion information to be applied to the first sub-block and the second sub-block. The motion information is selected from the same motion information candidate list. In order to avoid the selection of the same motion information for both sub-block parts (which would be identical to having no sub-block partitions), the second index is incremented by a pre-defined number (for example, one) if it is greater than or equal to the first index.

The embodiments 1-4 provide different efficient methods of signaling the motion information for each sub-block of a block that applies sub-block prediction.

Embodiment 5

The maximum value of first index and second index (denoted as M in embodiments 1 to 4) is less than or equal to the size of the Motion information candidate list, N.

It is noted that the maximum value of the first and the second indices also describe the number of entries in the motion information candidate list. For example if the maximum value of first index is 6 (assuming that the counting starts from 1, the index can assume the values of 1,2,3,4, 5 and 6), the size of the motion information candidate list is 6.

The merge candidate list could be constructed according to the methods in the ITU-T H.265 and in the VVC, see the above examples and disclosures about the merge list construction process in HEVC and in VVC.

The maximum value of the first index and the second index (given by M and which is equivalent to the size of the motion information candidate list) is less than or equal to the size of the merge candidate list N. It is noted that if a block is determined not to apply a sub-block prediction mode, the block might be predicted based on one of the entries in the merge candidate list. However if the block is predicted using the sub-block prediction mode, entries of the motion information candidate list are used to predict the block.

For example, when a prediction indicator parsed from the bitstream indicates that a sub-block prediction is to be applied on a block, two different indicators are obtained, and these two different indicators indicate separately two different entries in a motion information candidate list for two sub-blocks in the block, and inter prediction is performed for the block based on the two different indicators. When the predication indicator parsed from the bitstream indicates that the sub-block prediction is not to be applied on the block, a single indicator is obtained, and the single indicator indicates an entry in a merge candidate list (for example, may be constructed according to the methods in the ITU-T H.265 and in the VVC) for the block; and inter-prediction (for example, non-sub-block prediction) is performed for the block based on the single indicator.

The maximum value of first index is set equal to M, if M is less than or equal to N, where N is the size (number of candidates) of the Merge candidate list. Otherwise (if N is less than M) the maximum value of first merge index is set equal to N.

In an embodiment, N might be derived from an indicator that is included in the bitstream and M might be a predefined number.

For an example, the value M (describing the maximum value of the first index) might be 5, which is predetermined. And the value of N (size merge candidate list) might be signaled in the sequence parameter set (SPS). If the value of N is signaled as 6, the maximum value of the first index is equal to 5 (4 if the counting starts from 0), since N is greater than M. In another scenario, if N is signaled to be 3 in the SPS, then the maximum value of the first index is equal to 3 (2 if the counting starts from 0).

It is noted that N is the size of the merge candidate list, which could be constructed according to the methods in the ITU-T H.265 and in the VVC. The first index and the second index that are used in the embodiments point to a different list, namely motion information candidate list which is composed only of uni-prediction candidates. The motion information candidate list might be not identical to the merge candidate list, since the merge candidate list might include bi-prediction candidates, which are prohibited to be used when a block is determined to apply sub-block (or triangular) prediction. In this case, each sub-block must apply a uni-prediction motion information, hence the first index and the second index point to entries in a motion information candidate list that only includes uni-prediction candidates. The motion information candidates list might be constructed by using the same spatial and temporal neighbor blocks that are used in the construction of the merge candidate list. Alternatively the motion information candidate list might be constructed based on the entries of the merge candidate list. In an embodiment, motion information candidate list might be not constructed explicitly, for example, uni-prediction candidates can be derived directly from the merge candidate list.

For the block based prediction, only one set of motion information is signaled (in the form of merge index in one implementation). Since in the case of sub-block prediction two sets of motion information are necessary (increasing the signaling overhead), the values of the indices are expected to be not greater than the maximum value of the merge index (maximum value of the merge index is equivalent to the size of merge candidate list).

Since the motion information candidate list is expected to be constructed based on the candidates that are used to construct the merge candidate list or based on the entries of the merge candidate list, the motion information candidate list would not have a size greater than the size of the merge candidate list.

Therefore, the size of the motion information candidate list (and hence the maximum values of the first and the second indices) are set equal or less than the merge candidate list.

In another feasible implementation, N might be derived from an indicator that is included in the bitstream and M might be derived from an indicator that is included in the bitstream. In this case the indicator which is used to derive the value of M cannot indicate an M value that is greater than N.

In HEVC, the size of the motion information candidate list is N and N might be modified based on a syntax element that is included in the bitstream. The value of N might be a positive integer number (typically between 2 to 5) and it is signaled in the SPS. The size of the merge list is fixed for the whole video sequence.

The maximum value of the first index and the second index cannot be greater than the size of the motion information candidate list. Although the first index and the second index are used to select the motion information from a different list (motion information candidate list that is not same as the merge candidate list), the motion information candidate list might typically be constructed using the same spatial and temporal neighbor blocks (but applying different construction rules than the motion information candidate list).

In a particular implementation, the motion information candidates list might be constructed by converting the bi-prediction candidates in the merge candidate list into uni-prediction candidates. Accordingly, setting the maximum value of the first and the second index to be less than the size of the merge candidate list guarantees that a motion information candidates list which was constructed based on the merge candidate list might be used to select the motion information of each sub-block of the current block.

Embodiment 6

The first and second indices are binarized (converted from decimal to binary representation) using truncated unary binary code and based on the maximum value of the index. The maximum value of the indices are used in the process of mapping the decimal value of the index to the binary representation. The value codeword assignment for truncated unary binary code (truncated unary code with maximum decimal value being 4) is given below:

| Decimal value | Binary representation alternative 1 | Binary representation alternative 2 |
|---|---|---|
| 0 | 0 | 1 |
| 1 | 10 | 01 |
| 2 | 110 | 001 |
| 3 | 1110 | 0001 |
| 4 | 1111 | 0000 |

In the above table, each decimal value requires one more bit in the binary representation compared to the preceding decimal value (which is one less in decimal), except for the last decimal value which corresponds to the maximum value of the index. In this case (when the value of the index is 4, which is the maximum value), it is represented with same amount of bits in the binary representation with the preceding decimal value (which is 3).

If the first index has a maximum value of 4 (=M) and the second index has a maximum value of 3 (=M−1), the following binary representations are applied:

| Decimal value | Binary representation of first index | Binary representation of second index |
|---|---|---|
| 0 | 0 | 0 |
| 1 | 10 | 10 |
| 2 | 110 | 110 |
| 3 | 1110 | 111 |
| 4 | 1111 | |

Embodiment 7

Figure 14:
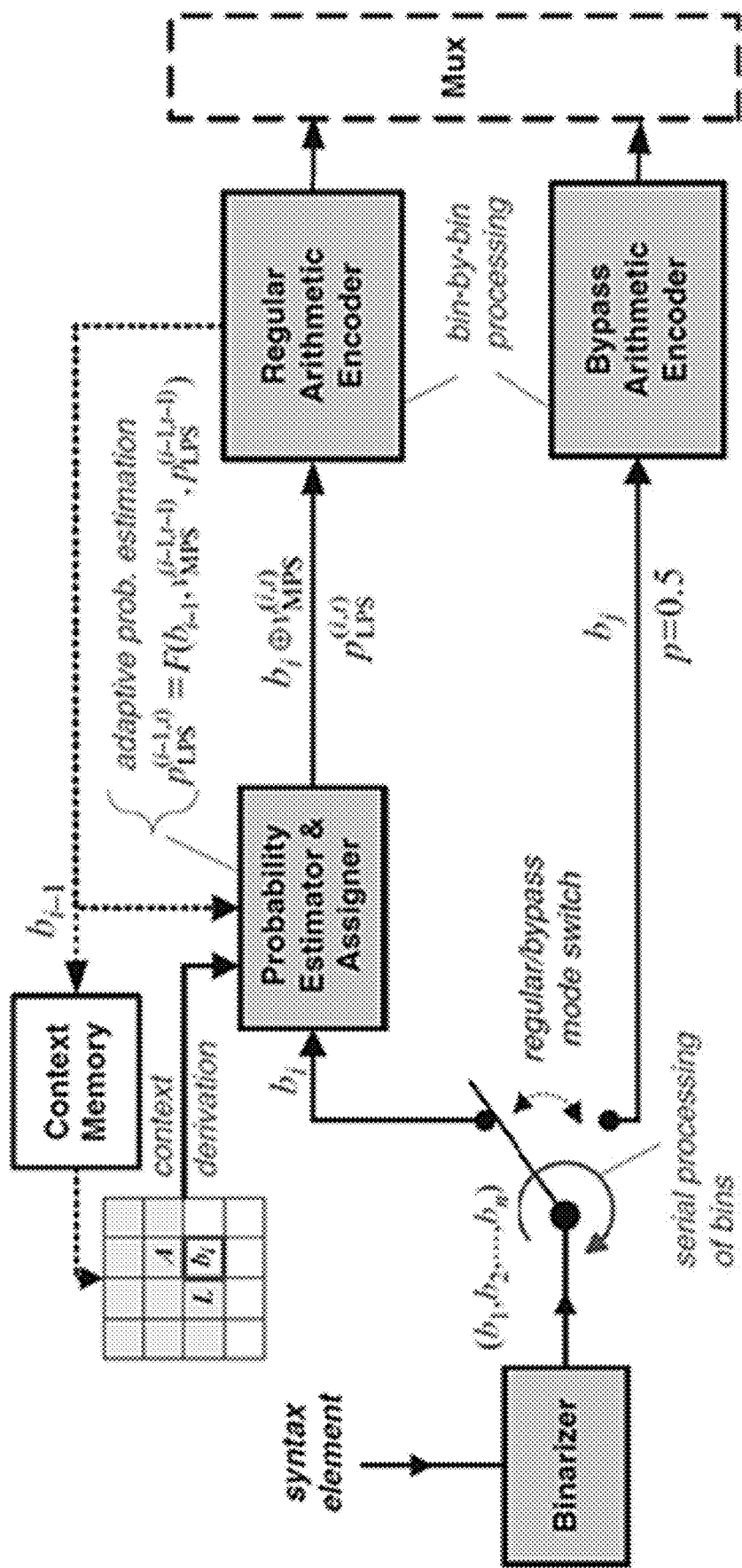
FIG. 14 is a schematic block diagram illustrating the process of CABAC according to an embodiment.

First bin of the first index is coded using regular coding mode of Context-based Adaptive Binary Arithmetic Coding (CABAC) (using probability estimation that is updated after coding of every occurrence of the first index), whereas the other bins are coded using by-pass mode of CABAC (using equal probabilities that are not updated). The regular coding mode of the CABAC is illustrated by the "Regular Arithmetic Encoder" branch of the FIG. 14. The by-pass mode is illustrated by the "Bypass Arithmetic Encoder" branch of the FIG. 14.

As an example, first bin of the second index is coded using regular coding mode of CABAC (using probability estimation that is updated after coding of every occurrence of the second index), whereas the other bins are coded using by-pass mode of CABAC (using equal probabilities that are not updated). In this case, the first index is included in the bitstream (or parsed by decoder from bitstream) by CABAC, where the first bin of the binarized first index is coded by CABAC using a first probability estimation model using regular mode coding mode of CABAC. The remaining bins of the binarized first index are coded using by-pass mode of CABAC. The second index is included in the bitstream (or parsed by decoder from bitstream) by CABAC, where the first bin of the binarized second index is coded by CABAC using a second probability estimation model using regular mode coding mode of CABAC. The remaining bins of the binarized second index are coded using by-pass mode of CABAC.

As another example, the first bin of the first index and the first bin of the second index are coded using regular coding mode of CABAC and same probability estimation model is used. The probability estimation model is updated after coding the first index and after coding the second index. In this case the first index is included in the bitstream (or parsed by decoder from bitstream) by CABAC, where the first bin of the binarized first index is coded by CABAC using a first probability estimation model using regular mode coding mode of CABAC. The remaining bins of the binarized first index are coded using by-pass mode of CABAC. The second index is included in the bitstream (or parsed by decoder from bitstream) by CABAC, where the first bin of the binarized second index is coded by CABAC using the first probability estimation model using regular mode coding mode of CABAC. The remaining bins of the binarized second index are coded using by-pass mode of CABAC.

The probability estimation model describes the probability of a bin having the value of a "1" instead of a "0". Probability estimation model is updated in order to adapt to the statistics, e.g. if the probability of observing a "1" is 0.8 (meaning that "0" is 0.2), then a bin that has a value of "1" is coded using less actual bits than "0" by CABAC.

The first bin is the first symbol of the binary representation, example is shown in the table as follows:

| Decimal value | Binary representation of first index | First bin of the first index |
|---|---|---|
| 0 | 0 | 0 |
| 1 | 10 | 1 |
| 2 | 110 | 1 |
| 3 | 1110 | 1 |
| 4 | 1111 | 1 |

Embodiment 8

If a sub-block prediction is determined to apply for a block,
1. An indicator that indicates the splitting direction is included in the bitstream.
2. If the size of the block is less than or equal to a specified threshold
   2.1 An initial first index is included in the bitstream that can have a maximum value of M (M is a positive integer and M ≤ N, N is the quantity of candidates in the Merge candidate list).
   2.2 An initial second index is included in the bitstream that can have a maximum value of M-m (m is a positive integer and m<M, m is a pre-defined value).
3. Otherwise (if the size of the block is greater than a specified threshold)
   3.1 A first index is included in the bitstream that can have a maximum value of P (P is a positive integer and M<P ≤ N, N is the quantity of candidates in the motion information candidate list).
   3.2 A second index is included in the bitstream that can have a maximum value of P−m (m is a positive integer and m<P, m is a pre-defined value).
4. If the value of initial second index is greater or equal to value of initial first index, the value of initial second index is incremented by a pre-defined number to obtain an updated second index (for example, the pre-defined number may be one).

5. The first sub-block part of the block is predicted by application of the motion information candidate which is determined based on the initial first index.

6. The second sub-block part of the block is predicted by application of the motion information candidate which is determined based on the updated second index.

Where P and M are positive integer values and M<P≤N.

The initial first index and the initial second index might be binarized as follows:

If the size of the block is less than or equal to a specified threshold:

(1) First index is converted from decimal to binary representation based on the maximum value M and by applying truncated binary coding;

(2) Second index is converted from decimal to binary representation based on the maximum value M−1 and by applying truncated binary coding.

If the size of the block is greater than a specified threshold:

(1) First index is converted from decimal to binary representation based on the maximum value P and by applying truncated binary coding;

(2) Second index is converted from decimal to binary representation based on the maximum value P−1 and by applying truncated binary coding.

The threshold might be a positive integer that is signaled in the bitstream or it might be a pre-defined number.

In order to determine if a block is greater than a threshold, the multiplication of width and height of the block might be compared with the threshold (width x height>threshold). In another example, both width and height might be compared with a threshold and if both of them are greater than the threshold (width>threshold AND height>threshold), the block might be considered as being greater than the threshold. In another example, if any of width and height are greater than the threshold (width>threshold OR height>threshold), the block might be considered as being greater than the threshold.

It is noted that the splitting direction indication, first index and the second index does not need to follow a particular order in the bitstream structure.

In an embodiment, there might be two splitting directions which might be (1) Splitting from top-left corner to bottom-right corner of the block (2) Splitting from top-right corner to bottom-left corner of the block In another feasible implementation, there might be four splitting directions which might be (1) Splitting from top-left corner to bottom-right corner of the block (2) Splitting from top-right corner to bottom-left corner of the block (3) Splitting from center-top point to center-bottom point of the block (4) Splitting from center-right point to center-left point of the block It is noted that In an embodiment, the splitting direction indication is not included in (or parsed from) the bitstream.

Embodiment 9

If a sub-block prediction is determined to apply for a block,

1. An initial first index is included in the bitstream that can have a maximum value of M. (M is an integer and M≤N, N is the quantity of candidates in the motion information candidate list)

2. An initial second index is included in the bitstream that can have a maximum value of M.

3. If the value of initial second index is greater or equal to the value of first index, the value of initial second index is incremented by a pre-defined number to obtain an updated second index (for example, the pre-defined number may be one).

4. The first sub-block part of the block is predicted by application of the motion candidate information which is determined based on the initial first index.

5. The second sub-block part of the block is predicted by application of the motion candidate information which is determined based on the updated second index.

The maximum value of initial first index and the second index is set equal to M, if M is less than or equal to N−1, where N is the size (number of motion candidates) of the motion information candidate list. Otherwise, the maximum value of first index and the second index is set equal to N−1.

It is noted that N is the size of the merge candidate list, which could be constructed according to the methods in the ITU-T H.265 and in the VVC. The first index and the second index that are used in the embodiments point to a different motion information candidate list which is composed only of uni-prediction candidates. The motion information candidate list is not identical to the merge candidate list, since the merge candidate list might include bi-prediction candidates, which are prohibited to be used when a block is determined to apply sub-block (or triangular) prediction. In this case, each sub-block must apply a uni-prediction motion information, hence the first index and the second index point to entries in a motion information candidate list that only comprises uni-prediction candidates. The motion information candidate list might be constructed by using the same spatial and temporal neighbor blocks that are used in the construction of the merge candidate list. In another example the motion information candidates list might be constructed based on the merge candidate list by converting the bi-prediction candidates in the merge candidate list into uni-prediction candidates.

In an embodiment, N might be derived from an indicator that is included in the bitstream and M might be a predefined number.

In another feasible implementation, N might be derived from an indicator that is included in the bitstream and M might be derived from an indicator that is included in the bitstream. In this case, the indicator which is used to derive the value of M cannot indicate an M value that is greater than N−1.

In a specific example, assume the motion information candidate list comprises 3 entries which are first motion information candidate (1st candidate), second motion information candidate (2nd candidate) and third motion information candidate (3rd candidate).

The values of the first and the second index are shown as examples in the below table as follows:

| Value of the index Y that is included in (parsed from) the bitstream | | Value of the index Z that is used to select the entry in the motion information candidate list | | Motion information applied by the Sub-block part X | |
|---|---|---|---|---|---|
| Y = First index | Y = Second index | Z = First index | Z = Second index | X = First sub-block part | X = Second sub-block part |
| 0 | 0 | 0 | 1 (incremented) | $1^{st}$ candidate | $2^{nd}$ candidate |
| 0 | 1 | 0 | 2 (incremented) | $1^{st}$ candidate | $3^{rd}$ candidate |
| 1 | 1 | 1 | 2 (incremented) | $2^{nd}$ candidate | $3^{rd}$ candidate |
| 1 | 0 | 1 | 0 | $2^{nd}$ candidate | $1^{st}$ candidate |

It is noted that the $3^{rd}$ motion information candidate cannot be selected to be applied in the first sub-block of the block. The advantage is that the maximum values of the first index and the second index that are include the in bitstream are same (1 in the above example). Accordingly, the same binarization scheme (truncated binary coding based on maximum value of 1) might be applied to binarize both first index and the second index.

The maximum value of the first and the second indices are set to be same. This feature has an additional benefit of using the same binarization scheme for both first and the second merge indices when truncated binary coding is used.

Embodiment 10

If a sub-block prediction is determined to apply for a block,
1. An initial first index is included in the bitstream that can have a maximum value of M. ((M is an integer and M $\leq$ N, N is the quantity of candidates in the motion information candidate list)
2. An initial second index is included in the bitstream that can have a maximum value of M.
3. The first sub-block part of the block is predicted by application of the motion candidate information which is determined based on the initial first index.
4. The second sub-block part of the block is predicted by application of the motion candidate information which is determined based on the initial second index.

In an embodiment, the first index and the second index are used to select entries in a motion information candidate list (the same list is used to select motion information by first index and second index), and the selected motion information candidates are applied to the first sub-block and the second sub-block of a block to predict the block. In an embodiment, the motion information candidate list might be composed of only uni-prediction motion information candidates. It is noted that the merge candidate list (such as merge candidate list of ITU-T H.265) might be composed of uni-prediction and bi-prediction motion information candidates. Therefore, the motion information candidate list used in the embodiment might be different from the merge candidate list of ITU-T H265.

The motion information candidate list is not identical to the merge candidate list, since the merge candidate list might include bi-prediction candidates, which are prohibited to be used when a block is determined to apply sub-block (or triangular) prediction. In this case each sub-block must apply a uni-prediction motion information, hence the first index and the second index point to entries in a motion information candidate list that only includes uni-prediction candidates. The motion information candidates list might be constructed by using the same spatial and temporal neighbor blocks that are used in the construction of the merge candidate list. In another example the motion information candidates list might be constructed based on the merge candidate list by converting the bi-prediction candidates in the merge candidate list into uni-prediction candidates.

It is noted that the first and the second index does not need to follow a particular order in the bitstream structure.

It is noted that identical operations are performed in the encoder and decoder except for the inclusion of the indicator (index) into the bitstream. In the decoder the indictor is parsed from the bitstream, whereas the indicator is included in the bitstream by encoder.

In a specific example, assume a motion information candidate list that includes motion information candidates with 6 entries. Further assume that the first motion candidate in the motion information candidate list is applied to the first sub-block for prediction and the fifth motion candidate in the motion information candidate list is applied to the second sub-block for prediction.

In the encoder side:
1. A value of 0 is included in the bitstream to indicate the value of the first index. (Index value 0 corresponds to first entry in the motion information candidate list, value 1 corresponds to second entry and so on.)
2. A value of 3 is included in the bitstream to indicate the value of the second index.
3. The first index is determined to point to the first motion candidate in a motion information candidate list. It is applied to predict the first sub-part of the block.
4. The second index is determined to point to the fourth motion candidate in the motion information candidate list. It is applied to predict the second sub-part of the block.

In the decoder side:
1. A value of 0 is parsed from the bitstream to indicate the value of the first index.
2. A value of 3 parsed from the bitstream to indicate the value of the second index.
3. The first index is determined to point to the first motion candidate in the motion information candidate list. It is applied to predict the first sub-part of the block.
4. The second index is determined to point to the fourth motion candidate in the motion information candidate list. It is applied to predict the second sub-part of the block.

In another specific example, assume the motion information candidate list comprises 3 entries which are First motion information candidate ($1^{st}$ candidate), Second motion information candidate ($2^{rd}$ candidate) and Third motion information candidate ($3^{rd}$ candidate).

The values of the first and the second index are as follows:

| Value of the index Y that is included in (parsed from) the bitstream | | Value of the index Z that is used to select the entry in the motion information candidate list | | Motion information applied by the Sub-block part X | |
|---|---|---|---|---|---|
| Y = First index | Y = Second index | Z = First index | Z = Second index | X = First sub-block part | X = Second sub-block part |
| 0 | 1 | 0 | 1 | $1^{st}$ candidate | $2^{nd}$ candidate |
| 0 | 2 | 0 | 2 | $1^{st}$ candidate | $3^{rd}$ candidate |

-continued

| Value of the index Y that is included in (parsed from) the bitstream | | Value of the index Z that is used to select the entry in the motion information candidate list | | Motion information applied by the Sub-block part X | |
|---|---|---|---|---|---|
| Y = First index | Y = Second index | Z = First index | Z = Second index | X = First sub-block part | X = Second sub-block part |
| 1 | 2 | 1 | 2 | $2^{nd}$ candidate | $3^{rd}$ candidate |
| 1 | 0 | 1 | 0 | $2^{nd}$ candidate | $1^{st}$ candidate |
| 2 | 0 | 2 | 0 | $3^{rd}$ candidate | $1^{st}$ candidate |
| 2 | 1 | 2 | 1 | $3^{rd}$ candidate | $2^{nd}$ candidate |
| 0 | 0 | 0 | 0 | $1^{st}$ candidate | $1^{st}$ candidate |
| 1 | 1 | 1 | 1 | $2^{nd}$ candidate | $2^{nd}$ candidate |
| 2 | 2 | 2 | 2 | $3^{rd}$ candidate | $3^{rd}$ candidate |

Embodiment 11

If a sub-block prediction is determined to apply for a block,
1. An indicator that indicates the splitting direction is included in the bitstream.
2. An initial first index is included in the bitstream that can have a maximum value of M. (M is an integer and $M \leq N$, N is the quantity of candidates in the motion information candidate list)
3. An initial second index is included in the bitstream that may have a maximum value of M−m (m is an integer and m<M, m is a pre-defined value).
4. If the value of initial second index is greater or equal to the value of first index, the value of initial second index is incremented by a pre-defined number to obtain an updated second index (for example, the pre-defined number may be one).
5. The first sub-block part of the block is predicted by application of the motion candidate information which is determined based on the initial first index.
6. The second sub-block part of the block is predicted by application of the motion candidate information which is determined based on the updated second index.

It is noted that N is the size of the merge candidate list, which could be constructed according to the methods in the ITU-T H.265 and in the VVC. The first index and the second index that are used in the embodiments point to a different motion information candidate list which is composed only of uni-prediction candidates. The motion information candidate list is not identical to the merge candidate list, since the merge candidate list might include bi-prediction candidates, which are prohibited to be used when a block is determined to apply sub-block (or triangular) prediction. In this case, each sub-block must apply a uni-prediction motion information, hence the first index and the second index point to entries in a motion information candidate list that only comprises uni-prediction candidates. The motion information candidate list might be constructed by using the same spatial and temporal neighbor blocks that are used in the construction of the merge candidate list. In another example, the motion information candidates list might be constructed based on the merge candidate list by converting the bi-prediction candidates in the merge candidate list into uni-prediction candidates.

The maximum value of initial first index is set equal to M.

In an embodiment, N might be derived from an indicator that is included in the bitstream and M might be a predefined number.

In another feasible implementation, N might be derived from an indicator that is included in the bitstream and M might be derived from an indicator that is included in the bitstream. In this case, the indicator which is used to derive the value of M cannot indicate an M value that is greater than N−1.

In another feasible implementation, N might be derived from an indicator that is included in the bitstream and M might be derived from N. For example, M might be derived from N as follows:
If N is equal to 1, M is equal to zero (subblock prediction is not used and syntax elements corresponding to the subblock prediction are not signaled);
If $N \geq 2$, M is equal to N.

For example, M might be derived from N according to the following table:

| N | M |
|---|---|
| 1 | 0 (subblock prediction is not used) |
| 2 | 2 |
| 3 | 3 |
| 4 | 4 |
| 5 | 5 |
| 6 | 6 |

In another feasible implementation, N might be derived from an indicator that is included in the bitstream and M might be derived from N. For example, M might be derived from N as follows:
If N is equal to 1, M is equal to zero (subblock prediction is not used and syntax elements corresponding to the subblock prediction are not signaled);
If $N \geq 2$ and $N \leq K$, M is equal to N, where K is integer predefined value (for example K might be equal to 5);
If N>K, M is equal to K.

For example, M might be derived from N according to the following table (K is equal to 5):

| N | M |
|---|---|
| 1 | 0 (subblock prediction is not used) |
| 2 | 2 |
| 3 | 3 |
| 4 | 4 |
| 5 | 5 |
| 6 | 5 |

Embodiment 12

If a sub-block prediction is determined to apply for a block,
1. An indicator that indicates the splitting direction is included in the bitstream.
2. An initial first index is included in the bitstream that can have a maximum value of M. (M is an integer)
3. An initial second index is included in the bitstream that may have a maximum value of M−m (m is an integer and m<M, m is a pre-defined value).

4. If the value of initial second index is greater or equal to the value of first index, the value of initial second index is incremented by a pre-defined number to obtain an updated second index (for example, the pre-defined number may be one).
5. The first sub-block part of the block is predicted by application of the motion candidate information which is determined based on the initial first index.
6. The second sub-block part of the block is predicted by application of the motion candidate information which is determined based on the updated second index.

The first index and the second index that are used in the embodiments point to a different motion information candidate list which is composed only of uni-prediction candidates. The motion information candidate list is not identical to the merge candidate list, since the merge candidate list might include bi-prediction candidates, which are prohibited to be used when a block is determined to apply sub-block (or triangular) prediction. In this case each sub-block must apply a uni-prediction motion information, hence the first index and the second index point to entries in a motion information candidate list that only comprises uni-prediction candidates. The motion information candidate list might be constructed by using the same spatial and temporal neighbor blocks that are used in the construction of the merge candidate list. In another example the motion information candidates list might be constructed based on the merge candidate list by converting the bi-prediction candidates in the merge candidate list into uni-prediction candidates.

The maximum value of initial first index is M.

In an embodiment, M might be derived from an indicator that is included in the bitstream.

M can depend on integer value N that is the size of the merge candidate list, which could be constructed according to the methods in the ITU-T H.265 and in the VVC.

In another feasible implementation, N might be derived from an indicator that is included in the bitstream and M might be a predefined number.

In another feasible implementation, N might be derived from an indicator that is included in the bitstream and M might be derived from N. For example, M might be derived from N as follows:
If N is equal to 1, M is equal to 2 (for some examples subblock mode can require initial first index not equal to updated second index);
If N≥2, M is equal to N.

For example, M might be derived from N according to the following table:

| N | M |
|---|---|
| 1 | 2 |
| 2 | 2 |
| 3 | 3 |
| 4 | 4 |
| 5 | 5 |
| 6 | 6 |

In another feasible implementation, N might be derived from an indicator that is included in the bitstream and M might be derived from N. For example, M might be derived from N as follows:
If N is equal to 1, M is equal to 2 (for some examples subblock mode can require initial first index not equal to updated second index);
If N≥2 and N≤K, M is equal to N, where K is integer predefined value (for example K might be equal to 5);
If N>K, M is equal to K.

For example, M might be derived from N according to the following table (K is equal to 5):

| N | M |
|---|---|
| 1 | 2 |
| 2 | 2 |
| 3 | 3 |
| 4 | 4 |
| 5 | 5 |
| 6 | 5 |

It is noted that the value of N (size of the merge candidate list) might be less than value of M (a maximum value of initial first index).

Figure 15:
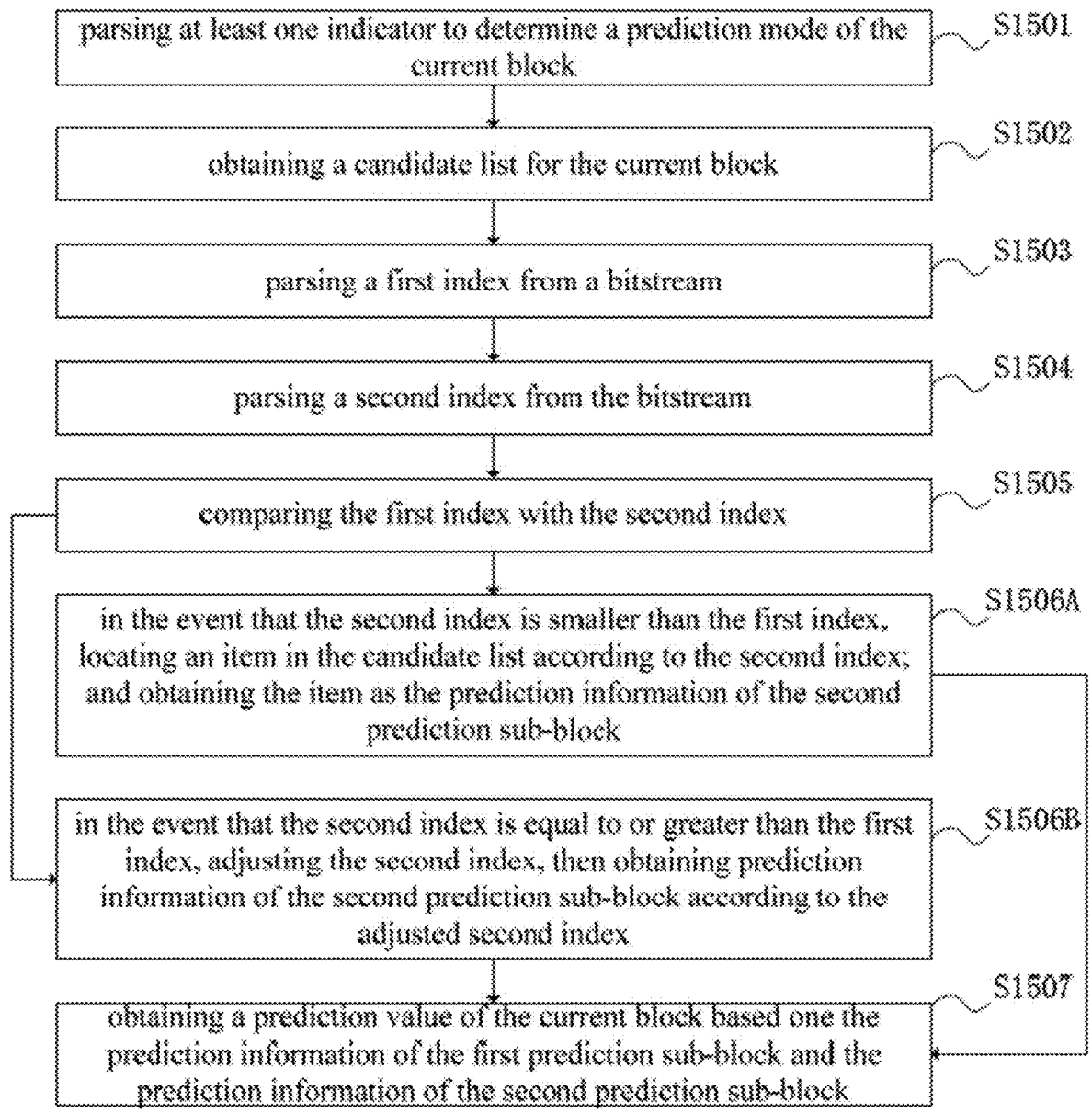
FIG. 15 is a block diagram illustrating an example of a prediction method according to an embodiment.

FIG. 15 shows an inter prediction method of the present application. The inter prediction method is performed for an image block in a sub-block based prediction method, for example, a triangle prediction mode.

In a triangle prediction mode, a current block comprises a first prediction sub-block and a second prediction sub-block, for example, $PU_1$ and $PU_2$ in FIG. 10A or FIG. 10B. It is noted that the present application might be also implemented based on different sub-block based prediction method, for example, the prediction modes shown in FIG. 11.

Operation S1501: parsing at least one indicator to determine a prediction mode of the current block.

Generally, inter prediction includes several inter prediction modes. The target inter prediction mode is selected in the encoder side using different criterions, for example RDO procedure, and encoded in a bitstream as one or more indicator. The decoder side parses the bitstream to achieve the value of the one or more indicator, and determine the target inter prediction mode according to the value of the one or more indicator.

In an embodiment, the indicator might be a prediction mode index.

In another feasible implementation, several indicators are combined to decide a prediction mode.

In the event that the determined prediction mode of the current block is a triangle prediction mode, the procedure of the present method continues.

Operation S1502: obtaining a candidate list for the current block.

The candidate list is obtained from a Merge mode candidate list. As an example, the construction of the Merge mode candidate list, and the construction of the uni-prediction candidate list for the triangle prediction of the current block might refer to the above sections.

It is noted that since the candidate list for the triangle prediction is derived from the Merge mode candidate list. In an embodiment, the candidate list might not an independent list. The candidate in the candidate list might be represented by the indicator points to a candidate in the Merge mode candidate list.

It is noted that the operation S1502 might be implemented after parsing prediction information indices of the first prediction sub-block and/or the second prediction sub-block. It is not limited in the present application.

Operation S1503: parsing a first index from a bitstream.

The first index is used to obtain prediction information of the first prediction sub-block.

As an example, parsing a syntax element that represents the first index from the bitstream; locating an item in the candidate list according to the first index; and obtaining the item as the prediction information of the first prediction sub-block.

Operation S1504: parsing a second index from the bitstream.

The second index is used to obtain prediction information of the second prediction sub-block.

As an example, parsing another syntax element that represents the second index from the bitstream.

Operation S1505: comparing the first index with the second index.

Operation S1506A: in the event that the second index is less than the first index, locating an item in the candidate list according to the second index; and obtaining the item as the prediction information of the second prediction sub-block.

Operation S1506B: in the event that the second index is equal to or greater than the first index, adjusting the second index, then obtaining prediction information of the second prediction sub-block according to the adjusted second index.

Similar with the operation S1506A, obtaining prediction information of the second prediction sub-block according to the adjusted second index, comprises: locating an item in the candidate list according to the adjusted second index; and obtaining the item as the prediction information of the second prediction sub-block.

In an embodiment, adjusting the second index might be incrementing the second index by m, wherein m is a positive integer.

In an embodiment, m might be 1.

In another feasible implementation, adjusting the second index might be other calculation based on the parsed value of the second index, and the adjusted value of the second index is different from the parsed value.

In a specific implementation, the operations S1505, S1506A and S1506B might be described as: Assuming the variables idxm and idxn, being the first index and the second index (adjusted), for the first prediction sub-block and the second prediction sub-block respectively, are derived using the parsed value of the first index (merge_triangle_idx0) and the parsed value of the second index (merge_triangle_idx1) as follows:

idxm=merge_triangle_idx0
idxn=merge_triangle_idx1+
(merge_triangle_idx1>=idxm)?1:0

It is noted that in another implementation, idxn might also derived as merge_triangle_idx1+(merge_triangle_idx1>idxm)?1:0. Similarly, in the event that the second index is equal to the first index, the action in S1506A or S1506B might be alternatively executed based on the different embodiments, which is not limited in the present application.

In an embodiment, wherein the first index is binarized according to a truncated unary code, the second index is binarized according to the truncated unary code.

In an embodiment, wherein a first bin of the binarized first index is coded using regular coding mode of CABAC, a first bin of the binarized second index is coded using regular coding mode of CABAC.

In an embodiment, wherein a non-first bin of the binarized first index is coded using bypass coding mode of CABAC, a non-first bin of the binarized second index is coded using bypass coding mode of CABAC. The non-first bin means any other bin of the binarized first index (or binarized second index), except for the first bin.

Operation S1507: obtaining a prediction value of the current block based one the prediction information of the first prediction sub-block and the prediction information of the second prediction sub-block.

After obtaining the prediction information of the first prediction sub-block and the prediction information of the second prediction sub-block, the prediction value of the current block might be obtained based on the construction method of the triangle prediction method as described in the above sections.

In an embodiment, the prediction method further comprising: parsing a direction indicator from the bitstream, and wherein the direction indicator is used to indicate a splitting direction of the current block. For example, when the direction indicator is 0, $PU_1$ and $PU_2$ are split by a splitting direction shown as the left figure of FIG. 10A or FIG. 10B, when the direction indicator is 1, $PU_1$ and $PU_2$ are split by a splitting direction shown as the right figure of FIG. 10A or FIG. 10B.

It is noted that parsing a direction indicator from the bitstream before parsing the first index from a bitstream In an embodiment, and parsing a direction indicator from the bitstream after deriving the adjusted second index in another feasible implementation. The implementing order is not limited in the present application, which means the direction indicator might be carried in the different positions by the bitstream.

Figure 16:
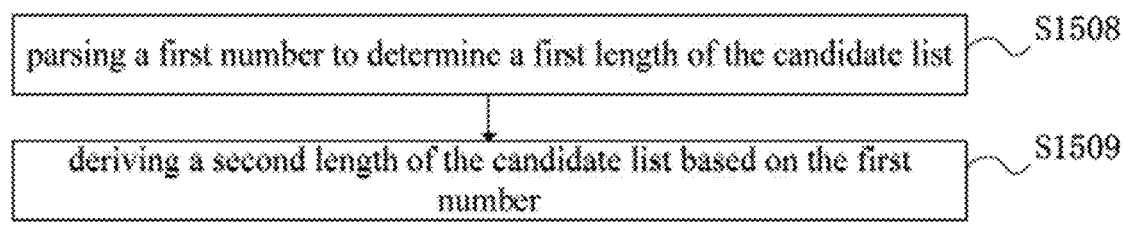
FIG. 16 is a block diagram illustrating another example of a prediction method according to an embodiment.

FIG. 16 shows another inter prediction method of the present application. It is noted that the codeword design of the first index and/or the second index based on the maximum allowed value of the first index and/or the second index. A decoder side cannot parse the first index and/or the second index successfully without obtaining the maximum allowed value of the first index and/or the second index.

In an embodiment, the maximum allowed value of the first index and/or the second index is obtained by both the encoder side and the decoder side according to a preset protocol, for example a preset value in a standard. In this case, no indicator for representing the maximum allowed value is signaled.

In another feasible implementation, one or more indicators for representing the maximum allowed value are signaled in the bitstream. So the decoder side can achieve a same value as that in the encoder side by parsing the bitstream.

It is noted that as an example, the first prediction sub-block and the second prediction sub-block share a same candidate list, the maximum allowed value of the first index and/or the second index might be considered as a length of the candidate list.

It is noted that the length of the candidate list might be encoded in the bitstream as high level syntax, for example, it might be included in the sequence parameter set, picture parameter set, picture header or slice header and so on. In this case, the length of the candidate list might be determined before the operation S1501.

The length of the candidate list might also be encoded in block or PU level. In this case, the length of the candidate list might be determined between the operation S1502 and the operation S1501.

The length of the candidate list is determined as following:

Operation S1508: parsing a first number to determine a first length of the candidate list.

In an embodiment, the first number is parsed from the bitstream directly.

In another feasible implementation, several syntaxes are parsed from the bitstream, and the parsed syntaxes are combined to determine the first number.

As an example, the first length is a maximum quantity of candidate prediction information for Merge Mode in the candidate list.

As described in the above sections, the candidate list for triangular prediction mode is derived from the candidate list for Merge Mode. The Merge Mode index might be also used as the first index and/or the second index. In this case, the candidate list for the triangular prediction mode might be considered as part of the candidate list for Merge Mode, for example as shown in FIG. 12, each candidate in the candidate list for triangular prediction mode corresponds to a uni-prediction motion information in the candidate list for Merge Mode. And the maximum quantity of candidate prediction information for Merge Mode and for the triangular prediction mode might be different.

Operation S1509: deriving a second length of the candidate list based on the first number.

The second length is a maximum quantity of candidate prediction information for a sub-block based prediction mode in the candidate list, wherein the sub-block based prediction mode is the triangle prediction mode or the geometric prediction mode. The prediction mode might be other sub-block based prediction mode, including rectangular or non-rectangular (trapezoid) mode. And the triangle prediction mode and the geometric prediction mode might be unified as a single prediction mode, which might also be involved in the feasible implementation.

Since the candidate list of the triangular prediction mode is derived from the candidate list of Merge Mode, the first length is equal to or greater than the second length.

In an embodiment, the second length might be obtained by subtracting a preset delta value from the first number.

In another feasible implementation, the second length might be obtained by subtracting a delta value from the first number, and the delta value is parsed from the bitstream.

It is noted that as shown in FIG. 12, uni-prediction candidate list is constructed for the triangular prediction mode, while bi-prediction candidate list is constructed for Merge Mode. In the present application, each motion information in the uni-prediction candidate list indicated by an index is a candidate for TPM; each motion information set (motion information for List0 and motion information for List1) in the bi-prediction candidate list indicated by an index is a candidate for Merge Mode.

The embodiment might also be described as:

Assuming the candidate list is a candidate list of Merge Mode, accordingly a Merge Mode index is used to indicate a candidate in the candidate list.

Operation S1508': parsing a first number to determine a maximum allowed candidate index in the candidate list.

The maximum allowed candidate index might be the maximum index for the Merge Mode. In other word, it is the maximum allowed value of the Merge Mode index.

Operation S1509': obtaining a maximum value index based on the maximum allowed candidate index.

The maximum value index is used to indicate the maximum limitation for the first index and the second index (the same indexes as described in the embodiment of FIG. 15).

It is noted that according to the present application. It is a redundancy for a sub-block based prediction mode if the first index and the second index are the same. Therefore, if the first index has a maximum limitation MAX, the second index will have a maximum limitation MAX-m when the second index is parsed from the bitstream. m is a positive integer, for example, m might be 1 in the present embodiment. And it is also noted that the adjusted second index in the present embodiment might be the same as the maximum limitation.

In an embodiment, obtaining the maximum index by a calculation between the maximum allowed candidate index and a predetermined number. For example, the maximum index equals to the maximum allowed candidate index—the predetermined number. In another example, the maximum index equals the predetermined number—the maximum allowed candidate index+an offset value.

In another feasible implementation, parsing a second number to derive a difference between the maximum allowed candidate index and the maximum index; and obtaining the maximum index by a calculation between the maximum allowed candidate index and the difference. For example, the maximum index equals to the maximum allowed candidate index–the difference. In another example, the maximum index equals to the difference–the maximum allowed candidate index+an offset value.

In another embodiment, the maximum index and the maximum allowed candidate index are signaled independently. For example, being similar with S1508 or S1508', parsing a third number to determine the maximum index.

And no matter the maximum index and the maximum allowed candidate index are signaled independently or dependently, In an embodiment, the maximum allowed candidate index, which is a maximum index of the Merge Mode, is not less than the maximum index.

In a specific implementation, max_num_merge_cand_minus_max_num_triangle_cand specifies the maximum number of triangular merge mode candidates supported in the slice (or in the picture, according to the different embodiments) subtracted from MaxNumMergeCand. six_minus_max_num_merge_cand specifies the maximum number of merging motion vector prediction (MVP) candidates supported in the slice subtracted from 6. The maximum number of merging MVP candidates, MaxNumMergeCand is derived as: MaxNumMergeCand=6–six_minus_max_num_merge_cand. The maximum number of triangular merge mode candidates, MaxNumTriangleMergeCand is derived as: MaxNumTriangleMergeCand=
MaxNumMergeCand–max_num_merge_cand_minus_max_num_triangle_cand.

max_num_merge_cand_minus_max_num_triangle_cand might be carried by the bitstream (be present), so the value of max_num_merge_cand_minus_max_num_triangle_cand can be parsed. It is noted that the value of MaxNumTriangleMergeCand shall be in the range of 2 to MaxNumMergeCand.

Based on a different condition, max_num_merge_cand_minus_max_num_triangle_cand might not be carried by the bitstream (be not present). In this case, when sps_triangle_enabled_flag is equal to 0 or MaxNumMergeCand is less than 2, MaxNumTriangleMergeCand is set equal to 0, which means triangle merge mode is not allowed for the current slice (or the current picture, according to the different embodiment); when sps_triangle_enabled_flag is equal to 1 and MaxNumMergeCand greater than or equal to 2, max_num_merge_cand_minus_max_num_triangle_cand is inferred to be equal to pps_max_num_merge_cand_minus_max_num_triangle_cand_plus1–1, wherein sps_triangle_enabled_flag is a syntax element included in sequence parameter set and indicating whether TPM is allowed, and pps_max_num_merge_cand_minus_max_num_triangle_candplus1 is a syntax element included in picture parameter set. pps_max_num_merge_cand_minus_max_num_triangle_candplus1 equals to 0 specifies that max_num_merge_cand_minus_max_num_triangle_cand is present in slice header of slices (or picture header of pictures, according to the different embodiment) referring to the picture parameter set. pps_max_num_merge_cand_minus_max_num_triangle_candplus1 is greater than 0 specifies that max_num_merge_cand_minus_max_num_triangle_cand is not present in slice header of slices (or picture header of pictures, according to the different embodiment) referring to the picture parameter set. The value of pps_max_num_merge_cand_minus_max_num_triangle_cand_plus1 shall be in the range of 0 to MaxNumMergeCand−1.

Alternatively, the first length and the second length might be signalled independently, which means the operation S1509 might be parsing a second number to determine a second length of the candidate list.

Similarly, In an embodiment, the second number is parsed from the bitstream directly. And in another feasible implementation, several syntaxes are parsed from the bitstream, and the parsed syntaxes are combined to determine the second number.

It is noted that any information parsed from the bitstream to indicate the first length and/or the second length directly or indirectly (for example, a difference value between the two lengths) can be carried by the bitstream in the sequence parameter set, picture parameter set, picture header or slice header and so on.

Figure 17:
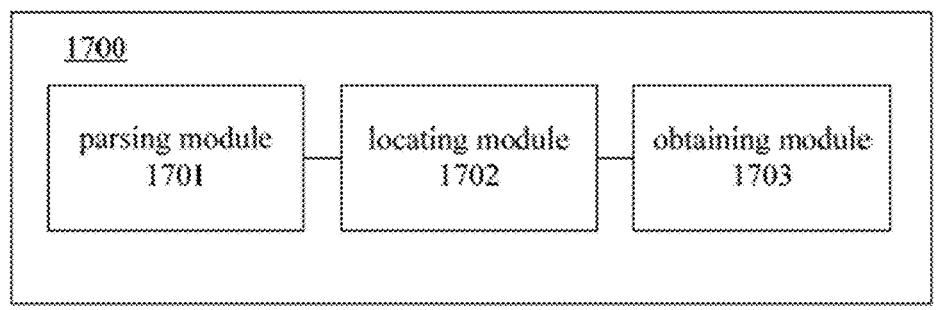
FIG. 17 is a block diagram showing an example of a prediction apparatus configured to implement embodiments of the application.

FIG. 17 shows an inter prediction apparatus 1700 of the present application.

A current block comprising a first prediction sub-block and a second prediction sub-block, the apparatus 1700 comprising: a parsing module 1701, configured to parse a first index from a bitstream, wherein the first index is used to obtain prediction information of the first prediction sub-block; and parse a second index from the bitstream; a locating module 1702, configured to compare the first index with the second index; and adjust the second index in the event that the second index is equal to or greater than the first index; and an obtaining module 1703, configured to obtain prediction information of the second prediction sub-block according to the adjusted second index.

In an embodiment, the locating module 1702 is configured to: increment the second index by m, wherein m is a positive integer.

In an embodiment, wherein m is one.

In an embodiment, before parsing a first index from a bitstream, the parsing module 1701 is further configured to: parse at least one indicator to determine a prediction mode of the current block, wherein the prediction mode is a triangle prediction mode or a geometric prediction mode. The prediction mode might be other sub-block based prediction mode, including rectangular or non-rectangular (trapezoid) mode. And the triangle prediction mode and the geometric prediction mode might be unified as a single prediction mode, which might also be involved in the feasible implementation.

In an embodiment, wherein the locating module 1702 is further configured to: obtain a candidate list for the current block.

In an embodiment, wherein the prediction information of the first prediction sub-block is obtained from the candidate list according to the first index.

In an embodiment, wherein the prediction information of the second prediction sub-block is obtained from the candidate list according to the adjusted second index.

In an embodiment, wherein the candidate list is a candidate list of Merge Mode.

In an embodiment, wherein the parsing module 1701 is configured to: parse a first number to determine a maximum allowed candidate index in the candidate list; and obtain a maximum index based on the maximum allowed candidate index, wherein the first index is not greater than the maximum index.

In an embodiment, wherein the parsing module 1701 is configured to: obtain the maximum index by a calculation between the maximum allowed candidate index and a predetermined number.

In an embodiment, wherein the parsing module 1701 is configured to: parse a second number to derive a difference between the maximum allowed candidate index and the maximum index; and obtain the maximum index by a calculation between the maximum allowed candidate index and the difference.

In an embodiment, wherein the parsing module 1701 is configured to: parse a third number to determine the maximum index.

In an embodiment, wherein the maximum allowed candidate index is not less than the maximum index.

In an embodiment, wherein after obtaining prediction information of the second prediction sub-block according to the adjusted second index, the obtaining module 1703 is further configured to: obtain a prediction value of the current block based one the prediction information of the first prediction sub-block and the prediction information of the second prediction sub-block.

In an embodiment, wherein the first index or the second index is binarized according to a truncated unary code.

In an embodiment, wherein a first bin of the binarized first index or second index is coded using regular coding mode of CABAC.

In an embodiment, wherein a non-first bin of the binarized first index or second index is coded using bypass coding mode of CABAC.

In an embodiment, wherein the parsing module 1701 is configured to parse a direction indicator from the bitstream, and wherein the direction indicator is used to indicate a splitting direction of the current block.

Figure 18:
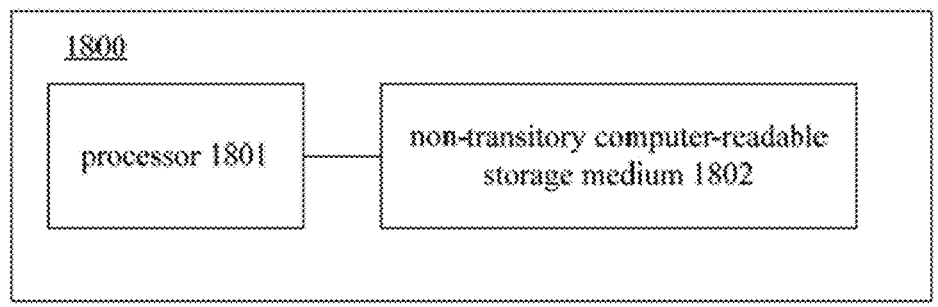
FIG. 18 is a block diagram illustrating an example of an encoding apparatus or a decoding apparatus according to an embodiment.

FIG. 18 shows an inter prediction apparatus 1800 of the present application, the apparatus 1800 might be a decoder or an encoder. The apparatus 1800 comprising: one or more processors 1801; and a non-transitory computer-readable storage medium 1802 coupled to the processors and storing programming for execution by the processors, wherein the programming, when executed by the processors, configures the decoder to carry out the method in FIG. 15 or FIG. 16.

In another embodiment, a computer program product comprising program code for performing the method in FIG. 15 or FIG. 16 when executed on a computer or a processor.

In another embodiment, a non-transitory computer-readable medium carrying a program code which, when executed by a computer device, causes the computer device to perform the method in FIG. 15 or FIG. 16.

Following is an explanation of the applications of the encoding method as well as the decoding method as shown in the above-mentioned embodiments, and a system using them.

Figure 19:
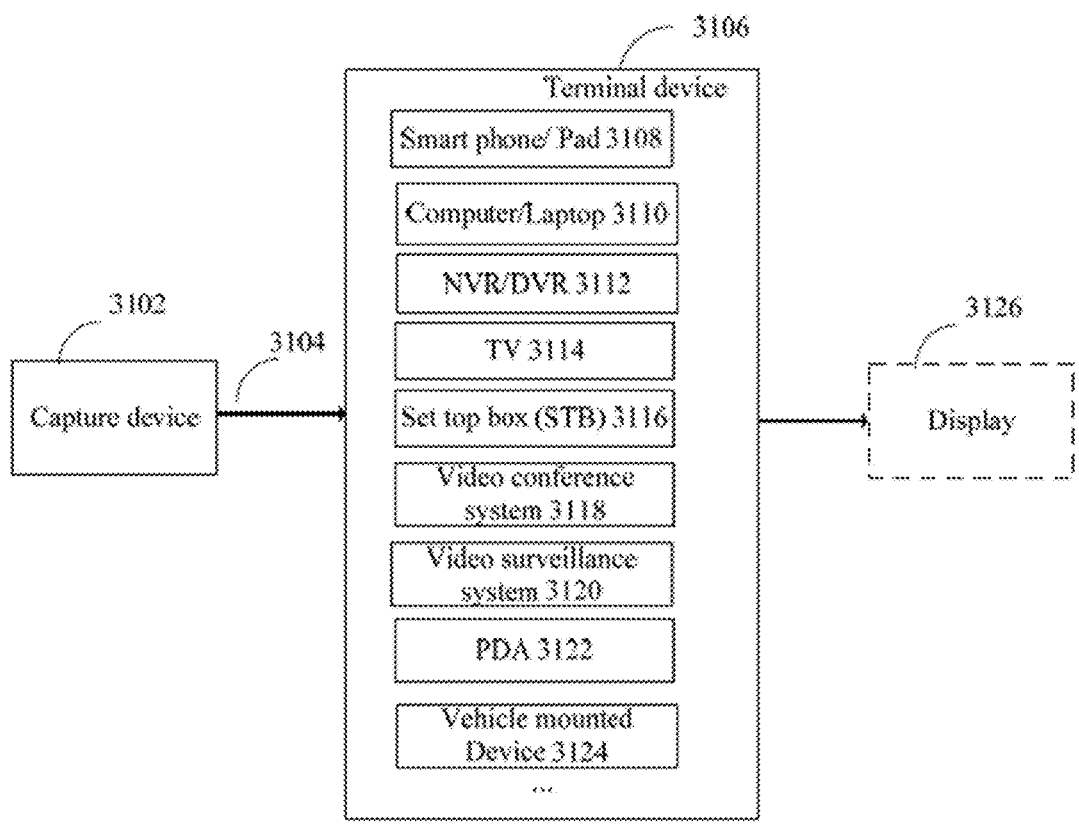
FIG. 19 is a block diagram showing an example structure of a content supply system 3100 which realizes a content delivery service according to an embodiment.

FIG. 19 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, might be used.

Figure 20:
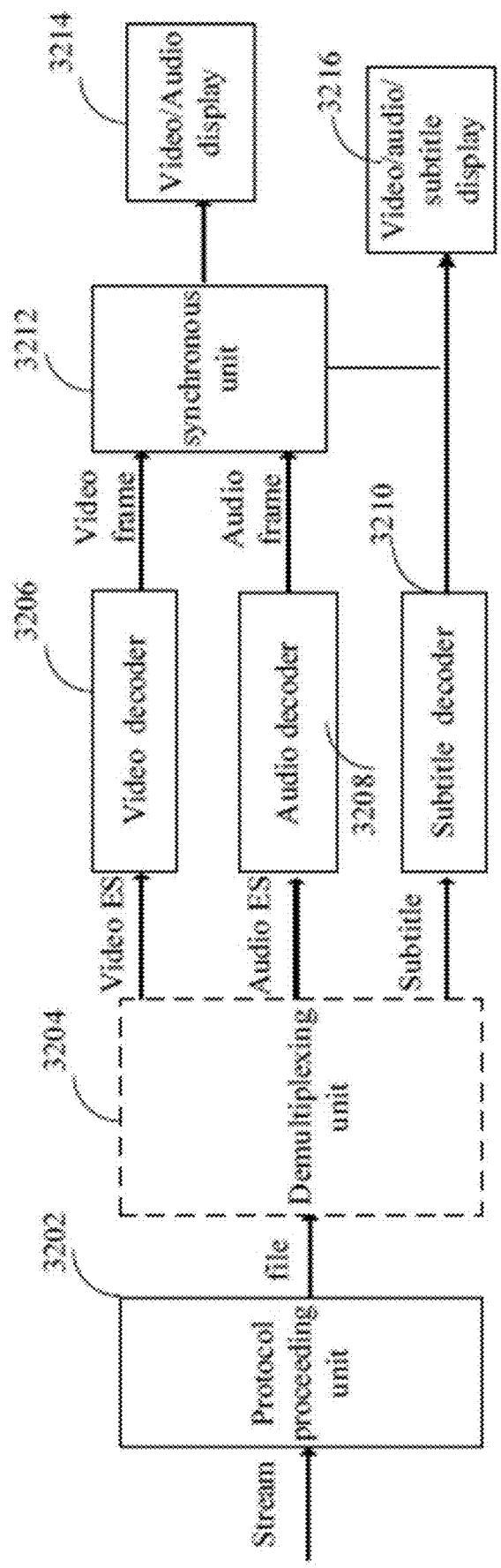
FIG. 20 is a block diagram showing a structure of an example of a terminal device according to an embodiment.

FIG. 20 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 20) before feeding it to the synchronous unit 3212. Similarly, the audio frame may store in a buffer (not shown in FIG. 20) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments might be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y}$$

f(i) The summation of f(i) with i taking all integer values from x up to and including y. Modulus. Remainder of x divided by y, defined only for integers x and y with x>=0 x % y and y>0.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

>Greater than

>=Greater than or equal to

<Less than

<=Less than or equal to

==Equal to

!=Not equal to

When a relational operator is applied to a syntax element or variable that has been assigned the value "na" (not applicable), the value "na" is treated as a distinct value for the syntax element or variable. The value "na" is considered not to be equal to any other value.

Bit-wise operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

Decrement, i.e., x−− is equivalent to x=x−1; when used in an array index, evaluates to the value of the variable prior to the decrement operation.

+=Increment by amount specified, i.e., x+=3 is equivalent to x=x+3, and x+=(−3) is equivalent to x=x+(−3).

−=Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \,\&\&\, y >= 0 \\ \text{Atan}\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

Clip1$_Y$(x)=Clip3(0, (1<<BitDepth$_Y$)−1, x

Clip1$_C$(x)=Clip3(0, (1<<BitDepth$_C$)−1, x $$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x)=Sign(x)*Floor(Abs(x)+0.5

$$\text{Sign} = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x−−" |
| "!x", "−x" (as a unary prefix operator) <br> $x^y$ |
| "$x * y$", "$x / y$", "$x \div y$", "$\frac{x}{y}$", "$x \% y$" |
| "$x + y$", "$x - y$" (as a two-argument operator), "$\sum_{i=x}^{y} f(i)$" |
| "x << y", "x >> y" <br> "x < y", "x <= y", "x > y", "x >= y" <br> "x == y", "x != y" <br> "x & y" <br> "x \| y" <br> "x && y" <br> "x \|\| y" <br> "x ? y : z" |

TABLE-continued

| Operation precedence from highest (at top of table) to lowest (at bottom of table) |
| --- |
| operations (with operands x, y, and z) |
| "x..y" |
| "x = y", "x += y", "x −= y" |

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

```
... as follows / ... the following applies:
If condition 0, statement 0
Otherwise, if condition 1, statement 1
...
Otherwise (informative remark on remaining condition), statement n
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements might be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:

```
... as follows / ... the following applies:
If all of the following conditions are true, statement 0:
    condition 0a
    condition 0b
Otherwise, if one or more of the following conditions are true,
statement 1:
    condition 1a
    condition 1b
...
Otherwise, statement n
```

In the text, a statement of logical operations as would be described mathematically in the following form:

```
if( condition 0 )
    statement 0
if( condition 1 )
    statement 1
``` may be described in the following manner:

When condition 0, statement 0
When condition 1, statement 1.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that might be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that might be used to store desired program code in the form of instructions or data structures and that might be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A prediction method for an image block, comprising:
    parsing a first index from a bitstream, wherein the first index is used to obtain prediction information of a first prediction sub-block, wherein a current block comprises the first prediction sub-block and a second prediction sub-block;
    parsing at least one indicator to determine a prediction mode of the current block, wherein the prediction mode includes a geometric prediction mode but is not a triangle prediction mode;
    parsing a second index from the bitstream;
    comparing the first index with the second index;
    adjusting the second index if the second index is equal to or greater than the first index; and
    obtaining prediction information of the second prediction sub-block according to the adjusted second index;
    obtaining prediction values of the current block according to the prediction mode of the current block, wherein the prediction values of the current block are based on the prediction information of a first prediction sub-block and the prediction information of the second prediction sub-block.

2. The prediction method of claim 1, wherein adjusting the second index comprising:
    incrementing the second index by m, wherein m is a positive integer.

3. The prediction method of claim 2, wherein m is one.

4. The prediction method of claim 1, wherein the prediction method further comprising:
    obtaining a candidate list for the current block.

5. The prediction method of claim 4, wherein the prediction information of the first prediction sub-block is obtained from the candidate list according to the first index, wherein the prediction information of the first prediction sub-block comprises motion information candidates.

6. The prediction method of claim 4, wherein the prediction information of the second prediction sub-block is obtained from the candidate list according to the adjusted second index.

7. The prediction method of claim 4, wherein the candidate list is a candidate list of Merge Mode.

8. The prediction method of claim 7, wherein the prediction method further comprising:
    parsing a first number to determine a maximum allowed candidate index in the candidate list; and
    obtaining a maximum index based on the maximum allowed candidate index, wherein the first index is not greater than the maximum index.

9. The prediction method of claim 8, wherein obtaining the maximum index based on the maximum allowed candidate index comprises:
parsing a second number to derive a difference between the maximum allowed candidate index and the maximum index; and
obtaining the maximum index by a calculation between the maximum allowed candidate index and the difference.

10. The prediction method of claim 1, wherein the prediction method further comprising: parsing a third number to determine a maximum index.

11. The prediction method of claim 1, wherein a maximum allowed candidate index is not less than a maximum index.

12. The prediction method of claim 1, wherein the first index or the second index is binarized according to a truncated unary code.

13. The prediction method of claim 12, wherein a first bin of the binarized first index or second index is coded using regular coding mode of context adaptive binary arithmetic coding (CABAC).

14. The prediction method of claim 12, wherein a non-first bin of the binarized first index or second index is coded using bypass coding mode of CABAC.

15. An apparatus for inter prediction, comprising:
a parsing module, configured to parse a first index from a bitstream, wherein the first index is used to obtain prediction information of a first prediction sub-block, wherein a current block comprises the first prediction sub-block and a second prediction sub-block; parse at least one indicator to determine a prediction mode of the current block, wherein the prediction mode includes a geometric prediction mode but is not a triangle prediction mode;
and
parse a second index from the bitstream;
a locating module, configured to compare the first index with the second index; and
adjust the second index if the second index is equal to or greater than the first index; and
an obtaining module, configured to obtain prediction information of the second prediction sub-block according to the adjusted second index; and
obtain prediction values of the current block according to the prediction mode of the current block, wherein the prediction values of the current block are based on the prediction information of a first prediction sub-block and the prediction information of the second prediction sub-block.

16. The apparatus of claim 15, wherein the locating module is configured to:
increment the second index by m, wherein m is a positive integer.

17. The apparatus of claim 16, wherein m is one.

18. The apparatus of claim 15, wherein the locating module is further configured to: obtain a candidate list for the current block.

19. The apparatus of claim 18, wherein the prediction information of the first prediction sub-block is obtained from the candidate list according to the first index, wherein the prediction information of the first prediction sub-block comprises motion information candidates.

20. The apparatus of claim 18, wherein the prediction information of the second prediction sub-block is obtained from the candidate list according to the adjusted second index.

21. The apparatus of claim 18, wherein the candidate list is a candidate list of Merge Mode.

22. The apparatus of claim 21, wherein the parsing module is configured to:
parse a first number to determine a maximum allowed candidate index in the candidate list; and
obtain a maximum index based on the maximum allowed candidate index, wherein the first index is not greater than the maximum index.

23. The apparatus of claim 22, wherein the parsing module is configured to:
parse a second number to derive a difference between the maximum allowed candidate index and the maximum index; and
obtain the maximum index by a calculation between the maximum allowed candidate index and the difference.

24. The apparatus of claim 15, wherein the parsing module is configured to: parse a third number to determine a maximum index.

25. The apparatus of claim 15, wherein a maximum allowed candidate index is not less than a maximum index.

26. The apparatus of claim 15, wherein the first index or the second index is binarized according to a truncated unary code.

27. The apparatus of claim 26, wherein a first bin of the binarized first index or second index is coded using regular coding mode of context adaptive binary arithmetic coding (CABAC).

28. The apparatus of claim 26, wherein a non-first bin of the binarized first index or second index is coded using bypass coding mode of CABAC.

* * * * *